US010012283B2

(12) United States Patent
Yamashita et al.

(10) Patent No.: US 10,012,283 B2
(45) Date of Patent: Jul. 3, 2018

(54) SHOCK ABSORBER AND VEHICLE USING THE SAME

(71) Applicant: HITACHI AUTOMOTIVE SYSTEMS, LTD., Hitachinaka-shi, Ibaraki (JP)

(72) Inventors: Mikio Yamashita, Zama (JP); Kunio Takiguchi, Yokohama (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 30 days.

(21) Appl. No.: 14/776,015

(22) PCT Filed: Mar. 27, 2014

(86) PCT No.: PCT/JP2014/058904
§ 371 (c)(1),
(2) Date: Sep. 14, 2015

(87) PCT Pub. No.: WO2014/157536
PCT Pub. Date: Oct. 2, 2014

(65) Prior Publication Data
US 2016/0040742 A1    Feb. 11, 2016

(30) Foreign Application Priority Data

Mar. 28, 2013 (JP) ................. 2013-070010

(51) Int. Cl.
*F16F 9/34* (2006.01)
*F16F 9/48* (2006.01)
(Continued)

(52) U.S. Cl.
CPC ............... *F16F 9/48* (2013.01); *B60G 13/08* (2013.01); *F16F 9/342* (2013.01); *B60G 2202/24* (2013.01); *B60G 2500/10* (2013.01)

(58) Field of Classification Search
CPC .......... F16F 9/3484; F16F 9/3485; F16F 9/48; F16F 9/342; F16F 9/486; B60G 13/08
See application file for complete search history.

(56) References Cited

U.S. PATENT DOCUMENTS 2,516,667 A    7/1950  Bachman
2,565,617 A    8/1951  Mercier
(Continued)

FOREIGN PATENT DOCUMENTS

DE    3216865 A1 *  1/1983  ............. F16F 9/342
EP    1050696 A2 * 11/2000  ............. F16F 9/348
(Continued)

OTHER PUBLICATIONS

Electronic translation of JP 2001-343041 A.*
(Continued)

*Primary Examiner* — Anna M Momper
(74) *Attorney, Agent, or Firm* — Mattingly & Malur, PC

(57) ABSTRACT

A minimum length-side property in which an extension-side damping coefficient signifies a hard state in a range (Aa0) where the piston rod enters further inside the cylinder than a minimum length-side predetermined position (Sa1), and a maximum length-side property in which the extension-side damping coefficient signifies a soft state in a range (Aa4) where the piston rod extends further outside the cylinder than a maximum length-side predetermined position (Sa4) are included. An extension-side damping force property between the minimum length-side predetermined position (Sa1) and the maximum length-side predetermined position (Sa4) includes a part (Sa1 to Sa2, Sa3 to Sa4) in which a damping coefficient change rate with respect to a stroke of the piston rod is large and a part (Sa2 to Sa3) in which the damping coefficient change rate is small. At least when the piston rod strokes to the extension side from the minimum (Continued)

length-side predetermined position (Sa1), the damping coefficient change rate is allowed to be large.

10 Claims, 14 Drawing Sheets

(51) Int. Cl.
*F16F 9/342* (2006.01)
*B60G 13/08* (2006.01)

(56) References Cited

U.S. PATENT DOCUMENTS

| | | | | |
|---|---|---|---|---|
| 4,883,150 A * | 11/1989 | Arai | ................ | B60G 17/01933 188/1.11 E |
| 4,953,671 A * | 9/1990 | Imaizumi | ................ | F16F 9/464 188/266.3 |
| 5,293,971 A * | 3/1994 | Kanari | .................... | F16F 9/468 188/282.1 |
| 5,509,513 A * | 4/1996 | Kiesel | .................... | F16F 9/486 188/289 |
| 5,810,128 A * | 9/1998 | Eriksson | ................ | F16F 9/342 188/285 |
| 8,651,252 B2 * | 2/2014 | Katayama | ............. | F16F 9/3484 188/282.6 |
| 9,815,517 B2 * | 11/2017 | Gonzalez | ............... | B62K 25/08 |
| 2012/0018264 A1 * | 1/2012 | King | ....................... | F16F 9/348 188/282.1 |
| 2012/0160624 A1 * | 6/2012 | Katayama | ............. | F16F 9/3484 188/314 |

FOREIGN PATENT DOCUMENTS

| | | | | |
|---|---|---|---|---|
| FR | 1052624 A | * | 1/1954 | ............. F16F 9/486 |
| GB | 799760 A | * | 8/1958 | ............. F16F 9/486 |
| GB | 2 231 385 | | 11/1990 | |
| JP | 62-108094 | | 7/1987 | |
| JP | 02-283928 | | 11/1990 | |
| JP | 02-283929 | | 11/1990 | |
| JP | 04-050526 | | 2/1992 | |
| JP | 2001343041 A | * | 12/2001 | ........... F16F 9/3484 |
| JP | 2003-063473 | | 3/2003 | |

OTHER PUBLICATIONS

International Search Report for PCT/JP2014/058904 dated May 27, 2014, four (4) pages.
Written Opinion of the ISA for PCT/JP2014/058904 dated May 27, 2014, four (4) pages.

* cited by examiner

SHOCK ABSORBER AND VEHICLE USING THE SAME

TECHNICAL FIELD

The present invention relates to a shock absorber and a vehicle using the same.

This application is the U.S. national phase of International Application No. PCT/JP2014/058904 filed Mar. 27, 2014 which designated the U.S. and claims priority to Japanese Patent Application No. 2013-070010, filed on Mar. 28, 2013, the entire contents of each of which are incorporated herein by reference.

BACKGROUND ART

In shock absorbers, there is a displacement response type shock absorber (for example, see Patent Literatures 1 and 2). The displacement response type shock absorber includes a bias spring configured to bias a disc valve to generate a damping force, configured to vary a spring force of the bias spring according to a position of a piston with respect to a cylinder and vary the damping force.

CITATION LIST

Patent Document

[Patent Document 1] Japanese Unexamined Patent Application, First Publication No. H02-283928
[Patent Document 2] Japanese Unexamined Patent Application, First Publication No. H02-283929

SUMMARY OF INVENTION

Problem to be Solved by the Invention

In such a shock absorber, further improvement in damping force properties is required.

The present invention provides a shock absorber and a vehicle using the same capable of further improving damping force properties.

Means for Solving the Problem

According to a first aspect of the present invention, a shock absorber includes: a cylinder in which a working fluid is sealed; a piston slidably fitted into the cylinder and configured to divide the inside of the cylinder into two chambers; a piston rod connected to the piston and extending toward the outside of the cylinder; a communication passage configured to cause the two chambers to communicate and configured to allow the working fluid to flow between the two chambers according to movement of the piston; and a damping force generating device installed at the communication passage and configured to limit a flow of the working fluid generated by movement of the piston to generate a damping force. The damping force generating device includes a minimum length-side property in which an extension-side damping coefficient signifies a hard state in a range where the piston rod enters further inside the cylinder than a minimum length-side predetermined position, a maximum length-side property in which the extension-side damping coefficient signifies a soft state in a range where the piston rod extends further outside the cylinder than a maximum length-side predetermined position, and a property in which the extension-side damping coefficient signifies a state of varying between the hard state and the soft state when the piston rod is between the minimum length-side predetermined position and the maximum length-side predetermined position. An extension-side damping force property between the minimum length-side predetermined position and the maximum length-side predetermined position includes a part in which a damping coefficient change rate with respect to a stroke of the piston rod is large and a part in which the damping coefficient change rate is small. At least when the piston rod strokes to the extension side from the minimum length-side predetermined position, the damping coefficient change rate is allowed to be large.

According to a second aspect of the present invention, in the shock absorber according to the first aspect, a range of the part in which the damping coefficient change rate is small of the extension-side damping force property may be wider than a range of the part in which the damping coefficient change rate is large.

According to a third aspect of the present invention, in the shock absorber according to the first aspect, the damping coefficient in the part in which the damping coefficient change rate is small may be determined such that the proportion of the damping coefficient to the critical damping coefficient becomes constant with respect to the change in mass added to the piston rod or the cylinder.

According to a fourth aspect of the present invention, in the shock absorber according to the second aspect, the damping coefficient in the part in which the damping coefficient change rate is small may be determined such that the proportion of the damping coefficient to a critical damping coefficient becomes constant with respect to the change in mass added to the piston rod or the cylinder.

According to a fifth aspect of the present invention, in the shock absorber according to the first aspect, the damping force generating device may adjust the passage area of the communication passage according to the position of the piston rod.

According to a sixth aspect of the present invention, a shock absorber includes: a cylinder in which a working fluid is sealed; a piston slidably fitted into the cylinder and configured to divide the inside of the cylinder into two chambers; a piston rod connected to the piston and extending toward the outside of the cylinder; a communication passage configured to cause the two chambers to communicate and configured to allow the working fluid to flow between the two chambers according to movement of the piston; and a damping force generating device installed at the communication passage and configured to limit a flow of the working fluid generated by movement of the piston to generate a damping force. The damping force generating device includes a maximum length-side property in which a compression-side damping coefficient signifies a hard state in a range where the piston rod extends further outside the cylinder than a maximum length-side predetermined position, a minimum length-side property in which the compression-side damping coefficient signifies a soft state in a range where the piston rod enters further inside the cylinder than a minimum length-side predetermined position, and a property in which the compression-side damping coefficient signifies a state of varying between the soft state and the hard state when the piston rod is between the maximum length-side predetermined position and the minimum length-side predetermined position. A compression-side damping force property between the maximum length-side predetermined position and the minimum length-side predetermined position includes a part in which a damping coefficient change rate with respect to a stroke of the piston rod is large and a part in which the damping coefficient change rate is small. At least when the piston rod strokes to the compression side from the maximum length-side predetermined position, the damping coefficient change rate is allowed to be large.

According to a seventh aspect of the present invention, in the shock absorber according to the sixth aspect, the damping force generating device may include a passage area adjustment mechanism configured to adjust a passage area of the communication passage according to the position of the piston rod.

According to an eighth aspect of the present invention, a vehicle uses the shock absorber according to the first aspect in only a rear wheel, of a front wheel and a rear wheel.

According to a ninth aspect of the present invention, a vehicle uses the shock absorber according to the fifth aspect in only a rear wheel, of a front wheel and a rear wheel.

Effects of the Invention

According to an aspect of the present invention described above, the damping force characteristics of a shock absorber and a vehicle can be further improved.

DESCRIPTION OF EMBODIMENTS

Figure 1:
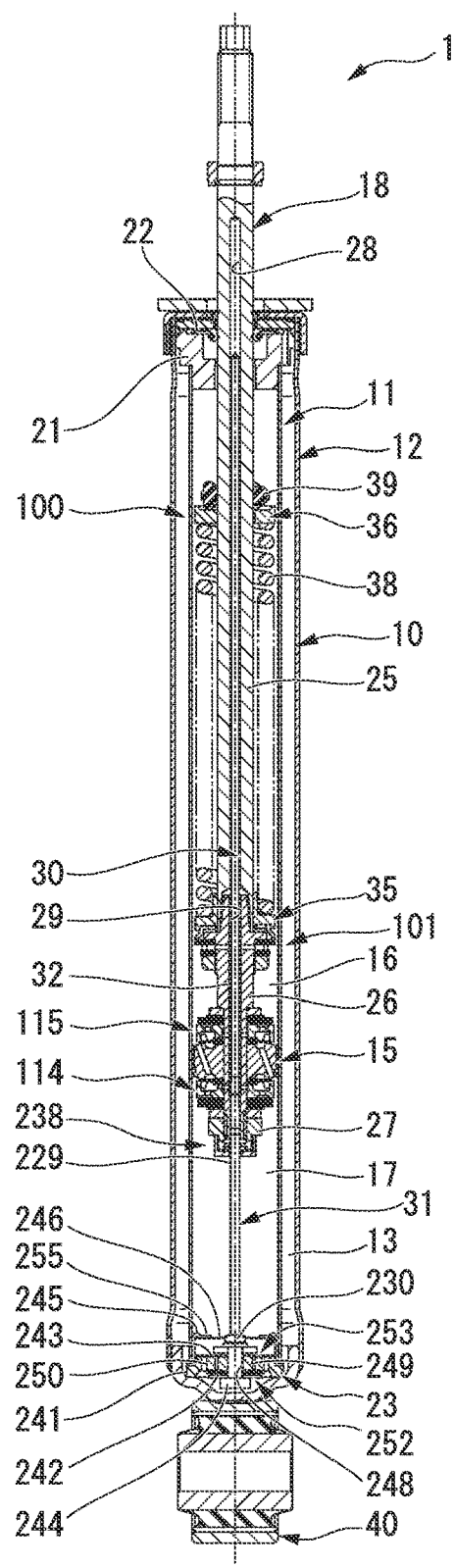
FIG. 1 is a cross-sectional view showing a shock absorber according to a first embodiment of the present invention.

Hereinafter, embodiments according to the present invention will be described with reference to the accompanying drawings.

First Embodiment

A first embodiment according to the present invention will be described based on FIGS. 1 to 7. In the following description, for the convenience of understanding, a lower side of the drawing is defined as either one side or a lower side, and an upper side of the drawing is defined as either the other side or an upper side.

A shock absorber 1 according to the first embodiment is a damping force adjustment type. The shock absorber 1 according to the first embodiment is, as shown in FIG. 1, a so-called dual pipe type hydraulic pressure shock absorber. The shock absorber 1 according to the first embodiment includes a cylinder 10. The cylinder 10 includes an inner cylinder 11 having a cylindrical shape and an outer cylinder 12 having a bottomed cylindrical shape. Liquid oil as a working fluid is sealed in the inner cylinder 11. The outer cylinder 12 has a larger diameter than the inner cylinder 11 and is installed concentrically with the inner cylinder 11 so as to cover the inner cylinder 11. A reservoir chamber 13 is formed between the inner cylinder 11 and the outer cylinder 12.

A piston 15 is slidably fitted in the inner cylinder 11. The piston 15 divides the inside of the inner cylinder 11 into two chambers, i.e., an upper chamber 16 and a lower chamber 17. Liquid oil is sealed in the upper chamber 16 and the lower chamber 17. The liquid oil and gas are sealed in the reservoir chamber 13.

A piston rod 18 has a first end section extending to the outside of the cylinder 10 and a second end section inserted into the inner cylinder 11. The piston 15 is connected to the second end section of the piston rod 18 inserted in in the cylinder 10. A rod guide 21 is mounted on first end opening sections of the inner cylinder 11 and the outer cylinder 12. An oil seal 22 is mounted on the first end opening section of the outer cylinder 12. The piston rod 18 is inserted through the rod guide 21 and the oil seal 22 to extend to the outside of the cylinder 10.

The rod guide 21 has an outer circumferential section having a stepped shape and a larger diameter at an upper section than a lower section thereof. The lower section of the rod guide 21 is fitted into an inner circumferential section of an upper end of the inner cylinder 11, and the upper section of the rod guide 21 is fitted into an inner circumferential section of an upper section of the outer cylinder 12. A base valve 23 is installed at a bottom section of the outer cylinder 12 and configured to divide the inner cylinder 11 into the lower chamber 17 and the reservoir chamber 13. An inner circumferential section of a lower end of the inner cylinder 11 is fitted into the base valve 23. An upper end section of the outer cylinder 12 is swaged inside in a radial direction. The oil seal 22 and the rod guide 21 are sandwiched by the inner cylinder 11 and the upper end section of the outer cylinder 12.

The piston rod 18 has a rod main body 25, a tip end rod 26, and a nut 27. The rod main body 25 passes through the rod guide 21 and the oil seal 22 such that it extends to the outside. The tip end rod 26 is threadedly engaged with and integrally connected to an end section inside the cylinder 10 of the rod main body 25. The nut 27 is threadedly engaged with and integrally connected to an end section (an end section on the lower side of FIG. 1) of the tip end rod 26, disposed opposite to the rod main body 25.

An insertion hole 28 is formed in an axial direction at a central part in a radial direction of the rod main body 25 from an end section (a lower side of FIG. 1, hereinafter, may be referred to as a "second end section") on the tip end rod 26 side to an intermediate position in the vicinity of the opposite end section (an upper side of FIG. 1, hereinafter, may be referred to as a "first end section"). In addition, a penetration hole 29 is formed in the axial direction at a central part in the radial direction of the tip end rod 26. The insertion hole 28 and the penetration hole 29 configure an insertion hole 30 of the piston rod 18. Accordingly, the piston rod 18 is formed to be hollow. A metering pin 31 has a second end section supported at the base valve 23 side. An intermediate section and a second end section of the metering pin 31 are inserted into the insertion hole 30 of the piston rod 18. A rod-inside communication passage (a communication passage) 32 through which the liquid oil is flowable in the piston rod 18 is formed between the insertion hole 30 and the metering pin 31.

An annular piston-side spring shoe 35 is installed near the piston 15 on the outer circumferential side of the rod main body 25 of the piston rod 18, and an annular rod guide-side spring shoe 36 is installed at a side of the piston-side spring shoe 35 opposite from the piston 15. The piston-side spring shoe 35 and the rod guide-side spring shoe 36 are configured to be slidable along the rod main body 25 as the rod main body 25 is inserted into the piston-side spring shoe 35 and the rod guide-side spring shoe 36. A rebound spring 38 configured of a coil spring is interposed between the piston-side spring shoe 35 and the rod guide-side spring shoe 36 as the rod main body 25 is inserted therethrough. A shock absorbing body 39 configured of an annular elastic material is installed at a position opposite to the rebound spring 38 in the rod guide-side spring shoe 36. The shock absorbing body 39 is also configured to be slidable along the rod main body 25 as the rod main body 25 is inserted therethrough.

For example, a first side of the shock absorber 1 is supported by a vehicle body, and a second side is fixed to a wheel side. Specifically, the shock absorber 1 is connected to the vehicle body by the piston rod 18 and is connected to the wheel side by an attachment eye 40 attached to the outside of the bottom section of the outer cylinder 12. Further, the reverse is also true, and the second side of the shock absorber 1 may be supported by the vehicle body, and the wheel side may be fixed to the first side of the shock absorber 1.

Figure 2:
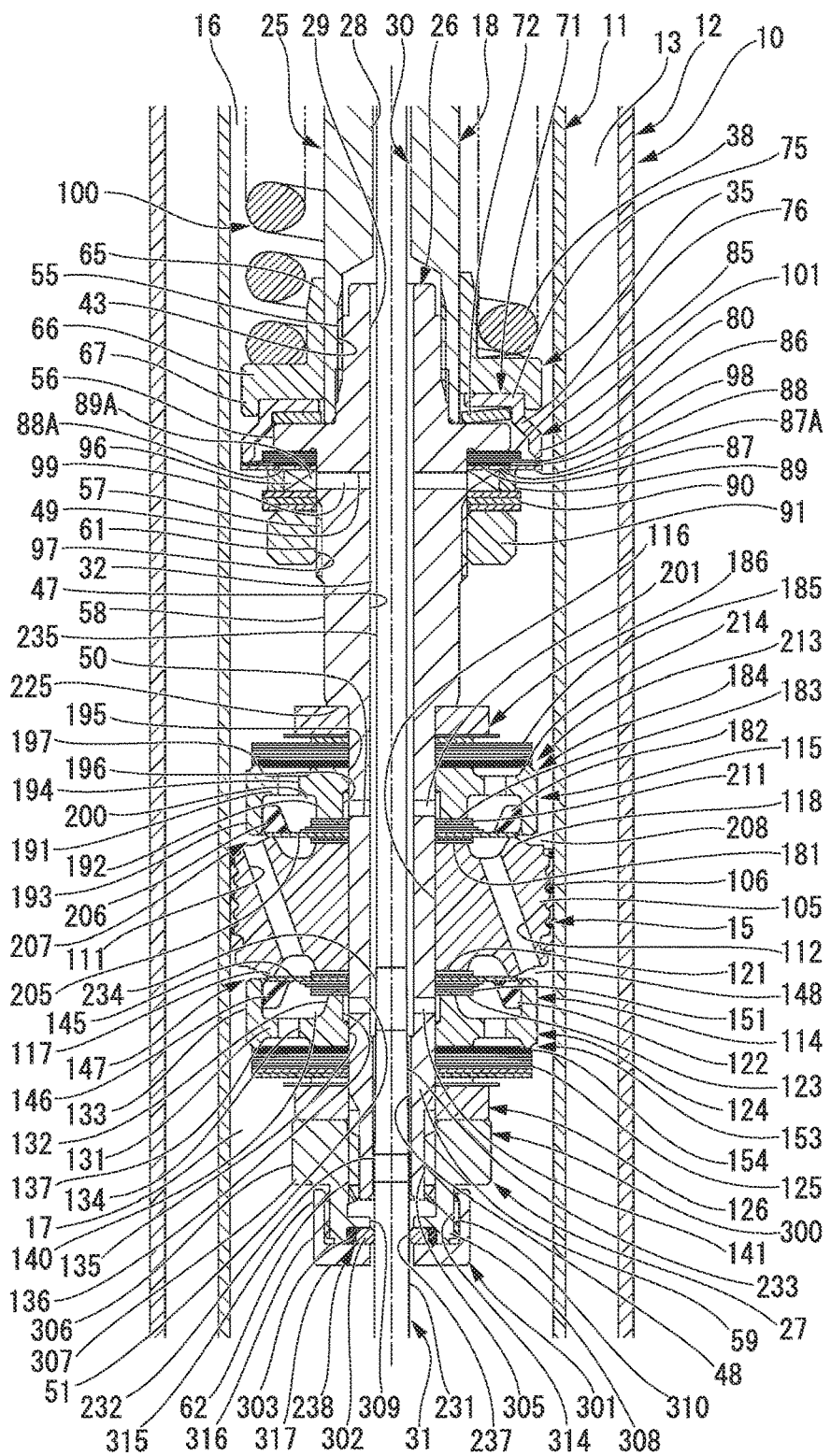
FIG. 2 is a cross-sectional view showing a major part of the shock absorber according to the first embodiment of the present invention.

As shown in FIG. 2, a screw hole 43 having a diameter larger than that of the insertion hole 28 and into communication with the insertion hole 28 is formed in a second end section of the rod main body 25.

The penetration hole 29 forms the rod-inside communication passage 32 of the tip end rod 26. The penetration hole 29 is configured of a large diameter hole section 47 disposed on the rod main body 25 side, and a small diameter hole section 48 disposed at an opposite side of the rod main body 25 and having a diameter smaller than that of the large diameter hole section 47. A passage hole 49, a passage hole 50, and a passage hole 51 are formed in the tip end rod 26 in sequence from the rod main body 25 side to pass therethrough in the radial direction. All of the passage holes 49 to 51 are formed at positions of the large diameter hole section 47 in the axial direction of the tip end rod 26.

The tip end rod 26 has a screw shaft section 55, a flange section 56, a holding shaft section 57, an intermediate shaft section 58, and an attachment shaft section 59 in sequence from the rod main body 25 side in the axial direction. The screw shaft section 55 is threadedly engaged with the screw hole 43 of the rod main body 25. The flange section 56 has an outer diameter larger than that of the screw shaft section 55 and the rod main body 25 so as to cause the rod main body 25 to abut the flange in a state where the screw shaft section 55 is threadedly engaged with the screw hole 43. The holding shaft section 57 has a diameter smaller than that of the flange section 56, and a male screw 61 is formed at a portion opposite in the axial direction to the flange section 56. The passage hole 49 is formed at a position of the holding shaft section 57 closer to the flange section 56 than the male screw 61. The intermediate shaft section 58 has an outer diameter slightly smaller than the root diameter of the male screw 61 of the holding shaft section 57. The attachment shaft section 59 is formed to have a diameter smaller than that of the intermediate shaft section 58. A male screw 62 is formed at an end section of the attachment shaft section 59 opposite in the axial direction to the intermediate shaft section 58. The passage hole 50 and the passage hole 51 are formed in the attachment shaft section 59 within a range closer to the intermediate shaft section 58 than the male screw 62. The passage hole 50 is disposed near the intermediate shaft section 58. The passage hole 51 is disposed near the male screw 62.

The piston-side spring shoe 35 has a cylindrical section 65, an abutting flange section 66, and a cylindrical projection 67. The abutting flange section 66 is formed to extend from one end side in the axial direction of the cylindrical section 65 outward in the radial direction. The projection 67 is formed to slightly protrude from an outer circumferential section of the abutting flange section 66 toward an opposite side in the axial direction of the cylindrical section 65. The piston-side spring shoe 35 abuts the end section in the axial direction of the rebound spring 38 in the abutting flange section 66 in a state in which the cylindrical section 65 is disposed inside the rebound spring 38.

A transmission member 71 and a wave spring 72 are interposed between the piston-side spring shoe 35 and the flange section 56 of the tip end rod 26. The transmission member 71 has an annular shape and is disposed closer to the piston-side spring shoe 35 than the wave spring 72. The transmission member 71 has a base plate section 75 and a tubular section 76. The base plate section 75 has a holed disk shape. The tubular section 76 is formed to extend in the axial direction from an outer circumferential edge section of the base plate section 75. A stepped shape having a large diameter is formed in the tubular section 76 at an opposite side of the base plate section 75. An inner circumferential side of the tip end section of the tubular section 76 is chamfered, and thereby an abutting section 80 having a smaller thickness in the radial direction than the other portion is formed at a tip end section of the tubular section 76.

The rod main body 25 is inserted through the transmission member 71. The transmission member 71 is configured such that the base plate section 75 is fitted into the projection 67 of the piston-side spring shoe 35 and is configured to abut the abutting flange section 66.

The wave spring 72 has an annular shape when seen in a plan view. As shown in a right side of a centerline of FIG. 2, the wave spring 72 has a shape in a natural state such that a position in the axial direction is varied according to a variation in position of at least one position in the radial direction and the circumferential direction. The wave spring 72, through which the rod main body 25 is inserted, is disposed inside the tubular section 76 of the transmission member 71, and is disposed at the base plate section 75 of the transmission member 71 opposite to the piston-side spring shoe 35. The wave spring 72 is elastically deformed to be flattened in the axial direction to generate a biasing force in the axial direction. The wave spring 72 biases the flange section 56 and the transmission member 71 of the tip end rod 26, which are both sides in the axial direction, to be separated from each other by a predetermined distance in the axial direction.

Here, when the piston rod 18 moves toward an extension-side, at which the piston rod 18 protrudes from the cylinder 10, i.e., an upper side, the wave spring 72, the transmission member 71, the piston-side spring shoe 35, the rebound spring 38, the rod guide-side spring shoe 36 and the shock absorbing body 39 shown in FIG. 1 are moved toward the rod guide 21 with the flange section 56 of the tip end rod 26 of the piston rod 18, and the shock absorbing body 39 abuts the rod guide 21 at a predetermined position.

When the piston rod 18 further moves in the protruding direction (an upper side), after the shock absorbing body 39 is collapsed, the shock absorbing body 39 and the rod guide-side spring shoe 36 are stopped with respect to the cylinder 10. On the other hand, the flange section 56 of the tip end rod 26 shown in FIG. 2, the wave spring 72, the transmission member 71, and the piston-side spring shoe 35 move further and shrink the rebound spring 38. A biasing force of the rebound spring 38 at this time works as a resistance force against a movement of the piston rod 18. In this way, the rebound spring 38 installed in the inner cylinder 11 elastically biases the piston rod 18 to limit an extension limit of the piston rod 18. Further, as the rebound spring 38 becomes resistance to the expansion limit of the piston rod 18 in this way, lifting of the wheel of the inner circumferential side when the shock-absorber-mounted vehicle is turned is limited to limit the roll amount of the vehicle body.

Here, when the piston rod 18 moves in the protruding direction and the shock absorbing body 39 shown in FIG. 1 abuts the rod guide 21, before the piston-side spring shoe 35 shrinks the rebound spring 38 interposed between the piston-side spring shoe 35 and the rod guide-side spring shoe 36 as described above, the flange section 56 of the piston rod 18 collapses the wave spring 72 with the transmission member 71 against the biasing force (refer to a left side of the centerline of FIG. 2). Accordingly, the transmission member 71 is slightly moved toward the flange section 56 in the axial direction.

Figure 3:
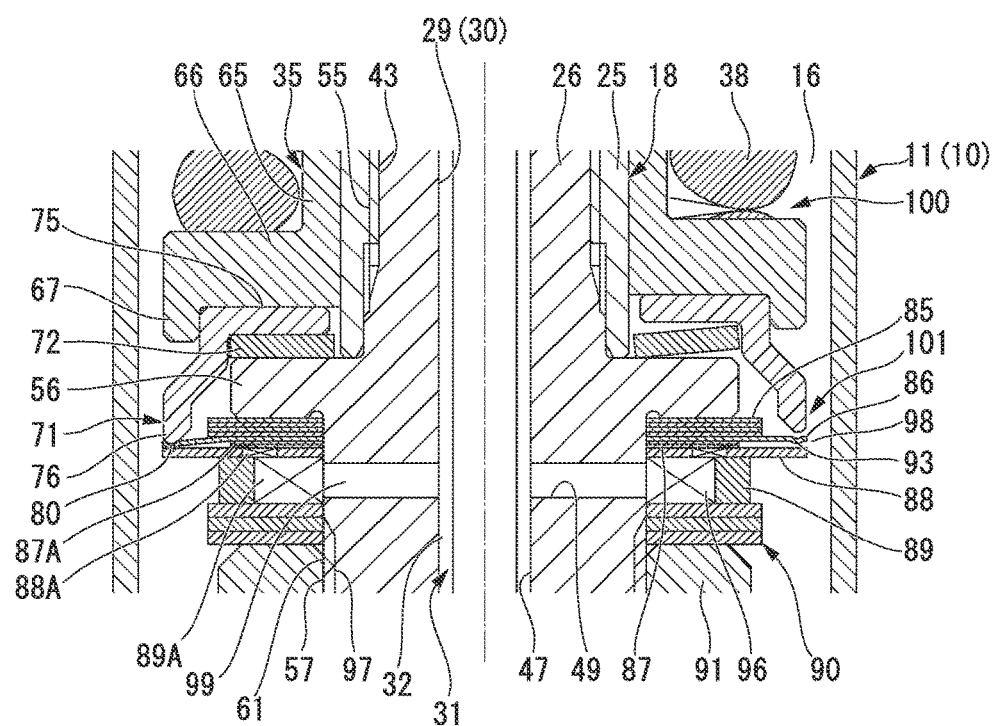
FIG. 3 is a cross-sectional view of a periphery of one of passage area adjustment mechanisms of the shock absorber according to the first embodiment of the present invention.

As shown in FIG. 3, a plurality of disks 85, an opening/closing disk 86, a plurality of intermediate disks 87, an abutting disk 88, a passage forming member 89, an intervention member 90, and a nut 91 are installed at the flange section 56 of the tip end rod 26 opposite in the axial direction to the piston-side spring shoe 35 in sequence from the flange section 56 side.

Each of the plurality of disks 85 has a holed disk shape and has an outer diameter smaller than an inner diameter of the abutting section 80 of the transmission member 71. The opening/closing disk 86 has a holed disk shape and has an outer diameter substantially equal to an outer diameter of the abutting section 80 of the transmission member 71. At the outer circumferential side of the opening/closing disk 86, an annular opening/closing section 93 concaved from a first surface in the axial direction toward a second surface in the axial direction and further protruding from the second surface in the axial direction toward the first surface in the axial direction is formed. The opening/closing section 93 is formed to have the same diameter as that of the abutting section 80 of the transmission member 71.

Each of the plurality of intermediate disks 87 has a holed disk shape and has an outer diameter smaller than that of the opening/closing disk 86. In addition, a plurality of notches 87A are formed at an outer circumferential side of the intermediate disk 87 near the abutting disk 88. The abutting disk 88 has a holed disk shape and has the same outer diameter as the opening/closing disk 86. A C-shaped through-hole 88A is formed in an intermediate section in the radial direction of the abutting disk 88. The passage forming member 89 has a holed disk shape and has an outer diameter smaller than that of the abutting disk 88. A plurality of notches 89A are formed at an inner circumferential side of the passage forming member 89. The intervention member 90 is configured of a plurality of holed disk-shaped members and has an outer diameter larger than that of the passage forming member 89. A passage 96 is formed in the intermediate disk 87, the abutting disk 88, and the passage forming member 89. The passage 96 brings the outside in the radial direction of the intermediate disk 87, i.e., the upper chamber 16 into communication with the passage hole 49. The passage 96 is configured of the notches 87A, the through-hole 88A, and the notches 89A. The notches 87A is formed at the outer circumferential section of the intermediate disk 87. The through-hole 88A is formed in the intermediate section in the radial direction of the abutting disk 88. The notches 89A are formed at the inner circumferential section of the passage forming member 89.

The plurality of disks 85, the opening/closing disk 86, the plurality of intermediate disks 87, the abutting disk 88, the passage forming member 89, and the intervention member 90 are disposed at the tip end rod 26 such that the holding shaft section 57 is inserted therethrough, and in this state, a female screw 97 of the nut 91 is threadedly engaged with the male screw 61. Accordingly, the plurality of disks 85, the opening/closing disk 86, the plurality of intermediate disks 87, the abutting disk 88, the passage forming member 89, and the intervention member 90 are sandwiched between the flange section 56 of the tip end rod 26 and the nut 91 in the axial direction.

As shown at a right side of a centerline of FIG. 3, in a state in which the base plate section 75 is spaced apart in the axial direction from the flange section 56 of the tip end rod 26 by the transmission member 71 with the biasing force of the wave spring 72, the abutting section 80 is spaced apart from the opening/closing section 93 of the opening/closing disk 86. Accordingly, the opening/closing section 93 is spaced apart from the abutting disk 88. Here, a gap between the opening/closing section 93 of the opening/closing disk 86 and the abutting disk 88, and the passage 96 of the intermediate disk 87, the abutting disk 88 and the passage forming member 89 configure an orifice 98. The orifice 98 and the passage hole 49 of the tip end rod 26 configure a communication passage 99. The communication passage 99 brings the upper chamber 16 into communication with the rod-inside communication passage 32.

As shown at a left side of the centerline of FIG. 3, the transmission member 71 moves the base plate section 75 toward the flange section 56 by the biasing force of the rebound spring 38 to collapse the wave spring 72. As a result, the abutting section 80 of the transmission member 71 abuts the opening/closing section 93 of the opening/closing disk 86 to bring the opening/closing section 93 in contact with the abutting disk 88. Accordingly, the orifice 98 is closed to block communication between the upper chamber 16 and the rod-inside communication passage 32 via the communication passage 99.

The transmission member 71, the piston-side spring shoe 35, the rebound spring 38, the rod guide-side spring shoe 36 and the shock absorbing body 39 shown in FIG. 1 configure a spring mechanism 100. The spring mechanism 100 is installed in the inner cylinder 11, has a first end that is capable of abutting the rod guide 21 shown in FIG. 1 near the end section of the inner cylinder 11, and has a second end that is capable of abutting the opening/closing disk 86 shown in FIG. 3. As shown in FIG. 3, the spring mechanism 100 biases the opening/closing disk 86 in a valve closing direction by the spring force against the biasing force of the wave spring 72. Then, the spring mechanism 100, the opening/closing disk 86 configured to open and close the orifice 98, and the abutting disk 88 configure a passage area adjustment mechanism 101. The passage area adjustment mechanism 101 adjusts a passage area of the orifice 98, i.e., the communication passage 99 according to the biasing force of the rebound spring 38 varied by a position of the piston rod 18. The orifice 98 is, in other words, a variable orifice having a variable passage area.

The relation of the passage area of the orifice 98 with respect to a stroke position of the piston rod 18 on the basis of the cylinder 10 is varied by the passage area adjustment mechanism 101. Specifically, the passage area of the orifice 98 becomes a maximum constant value when the piston rod 18 is between an end position of the compression-side and a predetermined close start position of the extension-side. At the close start position, the spring mechanism 100 starts to close the opening/closing disk 86 against the biasing force of the wave spring 72. At this time, the passage area of the orifice 98 is proportionally decreased toward the extension-side and is minimized when the piston rod 18 is at a predetermined close position where the opening/closing section 93 of the opening/closing disk 86 is abutted to the abutting disk 88. The passage area of the orifice 98 becomes a minimum constant value at a position closer to the extension-side than the predetermined close position.

As shown in FIG. 2, the piston 15 is configured of a piston main body 105 and an annular sliding member 106. The piston main body 105 is supported by the tip end rod 26. A sliding member 106 is mounted on the outer circumferential surface of the piston main body 105 and slides in the inner cylinder 11 of the cylinder 10.

A plurality of communication passages 111 and a plurality of communication passages 112 are installed at the piston main body 105. The communication passages 111 (only one is shown because the passages are shown in a cross-sectional view of FIG. 2) brings the upper chamber 16 into communication with the lower chamber 17 and allows the liquid oil to flow from the upper chamber 16 toward the lower chamber 17 upon movement of the piston 15 toward the upper chamber 16, i.e., an extension stroke. The communication passages 112 (only one is shown because the passages are shown in a cross-sectional view of FIG. 2) allows the liquid oil to flow from the lower chamber 17 toward the upper chamber 16 upon movement of the piston 15 toward the lower chamber 17, i.e., a compression stroke. The communication passages 111 are formed in a circumferential direction at equal pitches to sandwich the communication passages 112 therebetween, each sandwiched between the neighboring communication passages 111. A first end side (an upper side of FIG. 2) in the axial direction of the piston 15 of the communication passage 111 is opened outward in the radial direction, and a second end side (a lower side of FIG. 2) in the axial direction is opened inward in the radial direction.

Then, a damping force generating mechanism (damping force generating device) 114 is installed with respect to half the number of communication passages 111. The damping force generating mechanism 114 limits movement of the piston 15 to generate a damping force. The damping force generating mechanism 114 is disposed at the lower chamber 17 side, which is a second end side in the axial direction of the piston 15. The communication passages 111 configure a passage of the extension-side through which the liquid oil passes when the piston 15 moves to the extension-side at which the piston rod 18 expands to the outside of the cylinder 10. The damping force generating mechanism 114 installed with respect to these is a damping force generating mechanism of the extension-side configured to restrict a flow of the liquid oil in the communication passages 111 of the extension-side and generate a damping force.

In addition, the communication passages 112 that configure the remaining half are formed in the circumferential direction at equal pitches to sandwich the communication passages 111, each sandwiched between the neighboring passages 112. The communication passage 112 has a second end side (the lower side of FIG. 2) in the axial direction of the piston 15 opened outward in the radial direction and a first end side (the upper side of FIG. 2) in the axial direction opened inward in the radial direction.

Then, a damping force generating mechanism (damping force generating device) 115 is installed at the remaining half of the communication passages 112. The damping force generating mechanism 115 limits movement of the piston 15 to generate a damping force. The damping force generating mechanism 115 is disposed at the upper chamber 16 side in the axial direction, which is a first end side in the axial direction of the piston 15. The communication passages 112 configure a passage of the compression-side through which the liquid oil passes when the piston 15 is moved to the compression-side at which the piston rod 18 enters the cylinder 10. The damping force generating mechanism 115 installed with respect to these is a damping force generating mechanism of the compression-side configured to restrict a flow of the liquid oil in the communication passage 112 of the compression-side and generate a damping force.

The piston main body 105 has a substantially circular plate shape, and an insertion aperture 116 is formed at a center thereof. The insertion aperture 116 passes in the axial direction, and the attachment shaft section 59 of the tip end rod 26 is inserted therethrough. A seat section 117 is annularly formed at the end section of the piston main body 105 near the lower chamber 17 at the outside of a second end opening position of the communication passage 111 of the extension-side. A seat section 117 configures the damping force generating mechanism 114. A seat section 118 is annularly formed at a first end section of the piston main body 105 near the upper chamber 16 at the outside of a first end opening position of the communication passage 112 of the compression-side. A seat section 118 configures the damping force generating mechanism 115.

In the piston main body 105, a side of the seat section 117 opposite to the insertion aperture 116 has a stepped shape having a height in the axial direction smaller than that of the seat section 117, and a second end of the communication passage 112 of the compression-side is opened at the portion having the stepped shape. In addition, similarly, in the piston main body 105, a side of the seat section 118 opposite to the insertion aperture 116 has a stepped shape having a height in the axial direction smaller than that of the seat section 118, and a second end of the communication passage 111 of the extension-side is opened at the portion having the stepped shape.

The damping force generating mechanism 114 of the extension-side is a pressure control type valve mechanism. The damping force generating mechanism 114 has a plurality of disks 121, a damping valve main body 122, a plurality of disks 123, a seat member 124, a plurality of disks 125 and a valve restriction member 126 in sequence from the piston 15 side in the axial direction.

The seat member 124 has a bottom section 131, an inner cylindrical section 132, and an outer cylindrical section 133. The bottom section 131 has a holed disk shape in a direction perpendicular to the axis. The inner cylindrical section 132 has a cylindrical shape in the axial direction and is formed at an inner circumferential side of the bottom section 131. The outer cylindrical section 133 has a cylindrical shape in the axial direction and is formed at an outer circumferential side of the bottom section 131. The bottom section 131 is deviated to a first end side in the axial direction with respect to the inner cylindrical section 132 and the outer cylindrical section 133. A plurality of through-holes 134 passing in the axial direction are formed in the bottom section 131. A small diameter hole section 135 is formed inside the inner cylindrical section 132. The attachment shaft section 59 of the tip end rod 26 is fitted to the bottom section 131 side in the axial direction of the small diameter hole section 135. A large diameter hole section 136 having a diameter larger than that of the small diameter hole section 135 is formed inside the inner cylindrical section 132 at an opposite side of the bottom section 131 in the axial direction. An annular seat section 137 is formed at an end section of the outer cylindrical section 133 of the seat member 124 near the bottom section 131 in the axial direction. The plurality of disks 125 sit on the seat section 137.

A space (on the piston main body side of FIG. 3) opposite to the bottom section 131 in the axial direction, the space being surrounded by the bottom section 131, the inner cylindrical section 132, and the outer cylindrical section 133 of the seat member 124, and a through-hole 134 of the seat member 124 configure a pilot chamber 140. The pilot chamber 140 applies pressure to the damping valve main body 122 in the direction of the piston 15. The passage hole 51 of the tip end rod 26, the large diameter hole section 136 of the seat member 124, and an orifice 151 (to be described below) formed at the disk 123 are connected to the rod-inside communication passage 32 and the pilot chamber 140 to configure a pilot chamber introduction passage 141. The pilot chamber introduction passage 141 is configured to be capable of introducing the liquid oil into the pilot chamber 140 from the upper chamber 16 and the lower chamber 17 via the rod-inside communication passage 32. Accordingly, the damping force generating mechanism 114 of the extension-side having the pilot chamber introduction passage 141 is installed at the rod-inside communication passage 32.

The plurality of disks 121 have a holed disk shape having an outer diameter smaller than that of the seat section 117 of the piston 15. The damping valve main body 122 is configured of a disk 145 and a seal member 146. The disk 145 has a holed disk shape that is capable of sitting on the seat section 117 of the piston 15. The seal member 146 has an annular shape, is formed of a rubber material, and is fixed to a surface on the outer circumferential side of the disk 145 opposite to the piston 15. The damping valve main body 122 and the seat section 117 of the piston 15 are installed between the communication passage 111 installed at the piston 15 and the pilot chamber 140 installed at the seat member 124. The damping valve main body 122 and the seat section 117 configure a damping valve 147 of the extension-side. The damping valve 147 of the extension-side limits a flow of the liquid oil generated in the communication passage 111 by movement of the piston 15 to the extension-side and generates a damping force. Accordingly, the damping valve 147 is a disc valve. Further, the disk 145 has no portion passing in the axial direction except for a central hole passing through the attachment shaft section 59 of the piston rod 18.

A seal member 146 of the damping valve main body 122 comes in contact with the inner circumferential surface of the outer cylindrical section 133 of the seat member 124 to seal a gap between the damping valve main body 122 and the outer cylindrical section 133. Accordingly, the pilot chamber 140 between the damping valve main body 122 and the seat member 124 applies inner pressure to the damping valve main body 122 in the direction of the piston 15, i.e., in such a direction that the valve closes so as to abut the seat section 117. The damping valve 147 is a pilot type damping valve having the pilot chamber 140. When the damping valve main body 122 is separated from the seat section 117 of the piston 15 to be opened, the damping valve 147 allows the liquid oil from the communication passage 111 to flow to the lower chamber 17 via a passage 148 in the radial direction between the piston 15 and the seat member 124.

The plurality of disks 123 have a holed disk shape having a diameter smaller than that of the disk 145. The orifice 151 configured of an opening section is formed at one of the plurality of disks 123 near the seat member 124. As described above, the pilot chamber 140 comes into communication with the inside of the large diameter hole section 136 of the seat member 124 by the orifice 151.

The plurality of disks 125 have a holed disk shape that is capable of sitting on the seat section 137 of the seat member 124. The plurality of disks 125 and the seat section 137 configure a disc valve 153. The disc valve 153 limits a flow of the liquid oil between the pilot chamber 140 installed at the seat member 124 and the lower chamber 17. An orifice 154 configured of an opening section configured to bring the pilot chamber 140 into communication with the lower chamber 17 even in a state of abutting the seat section 137 is formed at one of the plurality of disks 125 near the seat section 137. The disc valve 153 brings the pilot chamber 140 into communication with the lower chamber 17 at a passage area larger than that of the orifice 154 as the plurality of disks 125 are separated from the seat section 137. The valve restriction member 126 is configured of a plurality of annular members and abuts the plurality of disks 125 to restrict deformation in a direction in which the disk 125 opens to a defined level or more.

The damping force generating mechanism 115 of the compression-side is also a pressure control type valve mechanism, similar to the damping force generating mechanism 114 of the extension-side. The damping force generating mechanism 115 has a plurality of disks 181, a damping valve main body 182, a plurality of disks 183, a seat member 184, a plurality of disks 185 and a valve restriction member 186 in sequence from the piston 15 side in the axial direction.

The seat member 184 has a bottom section 191, an inner cylindrical section 192, and an outer cylindrical section 193. The bottom section 191 has a holed disk shape in the direction perpendicular to the axis. The inner cylindrical section 192 is formed at an inner circumferential side of the bottom section 191 and has a cylindrical shape in the axial direction. The outer cylindrical section 193 is formed to have a cylindrical shape in the axial direction at an outer circumferential side of the bottom section 191. The bottom section 191 is deviated to a first end side in the axial direction with respect to the inner cylindrical section 192 and the outer cylindrical section 193. A plurality of through-holes 194 passing in the axial direction are formed in the bottom section 191. A small diameter hole section 195 is formed inside the inner cylindrical section 192. The attachment shaft section 59 of the tip end rod 26 is fitted to the small diameter hole section 195 near the bottom section 191 in the axial direction. A large diameter hole section 196 having a diameter larger than that of the small diameter hole section 195 is formed at an opposite side in the axial direction of the bottom section 191. An annular seat section 197 is formed at an end section of the outer cylindrical section 193 near the bottom section 191 in the axial direction. The plurality of disks 185 sit on a seat section 197.

A space (a space on the piston main body 105 side of the bottom section 191) opposite to the bottom section 191 of a space surrounded by the bottom section 191 of the seat member 184, the inner cylindrical section 192 and the outer cylindrical section 193, and the through-hole 194 configure a pilot chamber 200. The pilot chamber 200 applies pressure to the damping valve main body 182 in the direction of the piston 15. The passage hole 50 of the tip end rod 26, the large diameter hole section 196 of the seat member 184, and an orifice 211 (to be described below) formed in the disk 183 are connected to the rod-inside communication passage 32 and the pilot chamber 200 to thereby configure a pilot chamber introduction passage 201. According to the above-described configuration, the pilot chamber introduction passage 201 is capable of introducing the liquid oil into the pilot chamber 200 from the upper chamber 16 and the lower chamber 17 via the rod-inside communication passage 32. Accordingly, the damping force generating mechanism 115 of the compression-side having the pilot chamber introduction passage 201 is installed at the rod-inside communication passage 32.

The plurality of disks 181 have a holed disk shape having an outer diameter smaller than that of the seat section 118 of the piston 15. The damping valve main body 182 has a disk 205 and a seal member 206. The disk 205 has a holed disk shape that is capable of sitting on the seat section 118 of the piston 15. The seal member 206 has an annular shape, is formed of a rubber material, and is fixed to a surface on the outer circumferential side of the disk 205 opposite to the piston 15. The damping valve main body 182 and the seat section 118 of the piston 15 are installed between the communication passage 112 installed at the piston 15 and the pilot chamber 200 installed at the seat member 184 and configure a damping valve 207 of the compression-side. The damping valve 207 of the compression-side limits a flow of the liquid oil generated in the communication passage 112 by movement of the piston 15 toward the compression-side and generates a damping force. Accordingly, the damping valve 207 is a disc valve. Further, a portion passing in the axial direction is not formed in the disk 205 other than the central hole through which the attachment shaft section 59 of the piston rod 18 is inserted.

The seal member 206 comes in contact with the inner circumferential surface of the outer cylindrical section 193 of the seat member 184 and seals a gap between the damping valve main body 182 and the outer cylindrical section 193 of the seat member 184. Accordingly, the pilot chamber 200 between the damping valve main body 182 and the seat member 184 applies inner pressure to the damping valve main body 182 of the damping valve 207 in the direction of the piston 15, i.e., a direction that the valve closes so as to abut the seat section 118. The damping valve 207 is a pilot type damping valve having the pilot chamber 200. When the damping valve main body 182 is separated from the seat section 118 of the piston 15 to be opened, the damping valve 207 allows the liquid oil from the communication passage 112 to flow toward the upper chamber 16 via a passage 208 in the radial direction between the piston 15 and the seat member 184.

The plurality of disks 183 have a holed disk shape having a diameter smaller than that of the disk 205. The orifice 211 configured of an opening section is formed at one of the plurality of disks 183 of the seat member 184. As described above, the inside of the large diameter hole section 196 of the seat member 184 comes into communication with the pilot chamber 200 via the orifice 211.

The plurality of disks 185 have a holed disk shape that is capable of sitting on the seat section 197 of the seat member 184. The plurality of disks 185 and the seat section 197 configure a disc valve 213. The disc valve 213 limits a flow of the liquid oil between the pilot chamber 200 installed at the seat member 184 and the upper chamber 16. An orifice 214 configured of an opening section configured to bring the pilot chamber 200 into communication with the upper chamber 16 is formed at one of the plurality of disks 185 near the seat section 197 even in a state of abutting the seat section 197. The disc valve 213 brings the pilot chamber 200 into communication with the upper chamber 16 at a passage area larger than that of the orifice 214 as the plurality of disks 185 are separated from the seat section 197. The valve restriction member 186 is configured of a plurality of annular members, and abuts the plurality of disks 185 to restrict deformation in a direction in which the disk 185 opens to an extent of regulation or more.

The nut 27 is threadedly engaged with the male screw 62 of the tip end of the tip end rod 26. The nut 27 is configured of a nut main body 300 and a holding member 301. The nut main body 300 is made of metal and is formed to have a circular shape threadedly engageable with the male screw 62. The holding member 301 is made of metal and is threadedly engaged with the nut main body 300. A ring member 302 and an O-ring 303 are held to the nut main body 300 by the holding member 301.

The nut main body 300 has an annular main section 307, a substantially cyrindrical tubular section 308, and an inner flange section 309. A female screw 305 is formed on an inner circumferential section of the main section 307, and a tool engagement section 306 is formed on an outer circumferential section of the main section 307. The female screw 305 is threadedly engaged with the male screw 62 of the tip end rod 26. The tool engagement section 306 is formed such that a fastening tool such as a wrench is detachably attachable to the outer circumferential section. The tubular section 308 extends outward (downward in FIG. 2) in the axial direction from a second end in the axial direction on the inner circumferential side of the main section 307 to be formed in a substantially cyrindrical shape. The inner flange section 309 extends inward in the radial direction from an intermediate position in the axial direction of the tubular section 308 over the whole circumference to be formed in an annular shape. The nut main body 300 has a male screw 61 formed on an outer circumferential section of the tubular section 308.

The holding member 301 has a tubular section 316 and an inner flange section 317. A female screw 314 is formed on an inner circumferential section of the tubular section 316, and a tool engagement section 315 is formed on an outer circumferential section of the tubular section 316. The female screw 314 is threadedly engaged with the male screw 310 of the nut main body 300. The tool engagement section 315 is formed such that a fastening tool such as a wrench is detachably attachable to the tool engagement section 315. The inner flange section 317 is formed in an annular shape that extends inward in the radial direction from one end in the axial direction of the tubular section 316 over the whole circumference. The inner diameter of the inner flange section 317 is formed to be equal to the inner diameter of the inner flange section 309 of the nut main body 300.

The ring member 302 is made of metal and has an annular shape, and both sides in the axial direction of each of the inner circumferential surface and the outer circumferential surface of the ring member 302 are chamfered. The ring member 302 is formed such that the thickness is slightly smaller than the projection length of the nut main body 300 from the inner flange section 309 of the tubular section 308. Further, the inner diameter of the ring member 302 is smaller than the inner diameter of the inner flange section 309 of the nut main body 300 and the inner diameter of the inner flange section 317 of the holding member 301. The outer diameter of the ring member 302 is larger than the inner diameter of the inner flange section 309 and the inner diameter of the inner flange section 317.

The O-ring 303 is an elastic member made of rubber and has an annular shape. When the O-ring 303 is in a natural state, the inner diameter of the O-ring 303 is smaller than the outer diameter of the ring member 302, and the outer diameter of the O-ring 303 is larger than the inner diameter of the tubular section 308 of the nut main body 300.

When the nut 27 is assembled, the O-ring 303 is fitted into the inside of a section of the nut main body 300, the section extending from the inner flange section 309 of the tubular section 308. The ring member 302 is fitted into the inside of the O-ring 303, and the female screw 314 of the holding member 301 is threadedly engaged with the male screw 310 of the nut main body 300. At that time, the holding member 301 is fastened until the inner flange section 317 abuts to an end surface positioned opposite to the main section 307 of the tubular section 308, of end surfaces of the nut main body 300. Thereby, the O-ring 303 and the ring member 302 are held between the inner flange section 309 of the nut main body 300 and the inner flange section 317 of the holding member 301. At that time, the O-ring 303 is disposed on the outer circumferential side of the ring member 302 and is elastically deformed. As a result, a gap between the outer circumferential section of the ring member 302 and the tubular section 308 of the nut main body 300 is sealed, and by the elastic force, the ring member 302 is held concentrically with respect to the nut 27. From this neutral state, the ring member 302 is configured to be movable in all radial directions while further elastically deforming the O-ring 303.

The nut 27 assembled in advance as described above is threadedly engaged with the male screw 62 of the tip end rod 26 in the female screw 314 such that a section of the nut main body 300 opposite in the axid direction to the holding member 301 is disposed on the valve restriction member 126 side. Upon fastening, the nut 27 sandwiches inner circumferential sides of the valve restriction member 126, the plurality of disks 125, the seat member 124, the plurality of disks 123, the damping valve main body 122, the plurality of disks 121, the piston 15, the plurality of disks 181, the damping valve main body 182, the plurality of disks 183, the seat member 184, the plurality of disks 185 and the valve restriction member 186 between the nut 27 and a stepped surface 225 of the intermediate shaft section 58 of the tip end rod 26 near the attachment shaft section 59. In this state, the ring member 302 is installed movable in the radial direction on the second end side of the piston rod 18.

Figure 4:
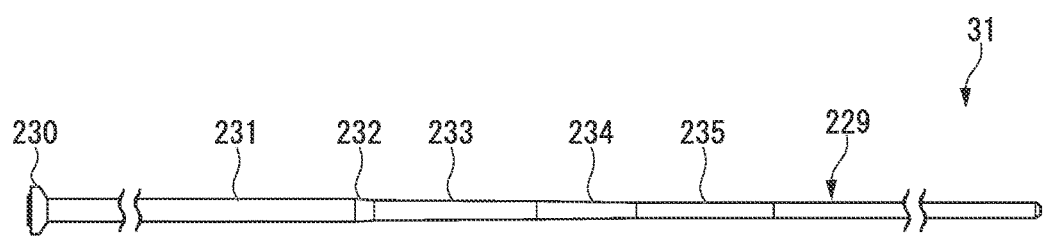
FIG. 4 is a lateral view showing a metering pin of the shock absorber according to the first embodiment of the present invention.

As shown in FIG. 4, the metering pin 31 is made of metal and has a main body shaft section 229 and a support flange section 230. The support flange section 230 extends in the radial direction from a first end of the main body shaft section 229. The metering pin 31 is supported by the base valve 23 in the support flange section 230 as shown in FIG. 1. As shown in FIG. 4, the main body shaft section 229 has a large diameter shaft section 231, a first tapered shaft section 232, a second tapered shaft section 233, a third tapered shaft section 234, and a small diameter shaft section 235. The large diameter shaft section 231 is formed on the support flange section 230 side. The first tapered shaft section 232 is formed at a position on the opposite side of the support flange section 230 in the large diameter shaft section 231. The second tapered shaft section 233 is formed at a position on the opposite side of the large diameter shaft section 231 in the first tapered shaft section 232. The third tapered shaft section 234 is formed at a position on the opposite side of the first tapered shaft section 232 in the second tapered shaft section 233. The small diameter shaft section 235 is formed on the opposite side of the second tapered shaft section 233 of the third tapered shaft section 234.

Figure 5:
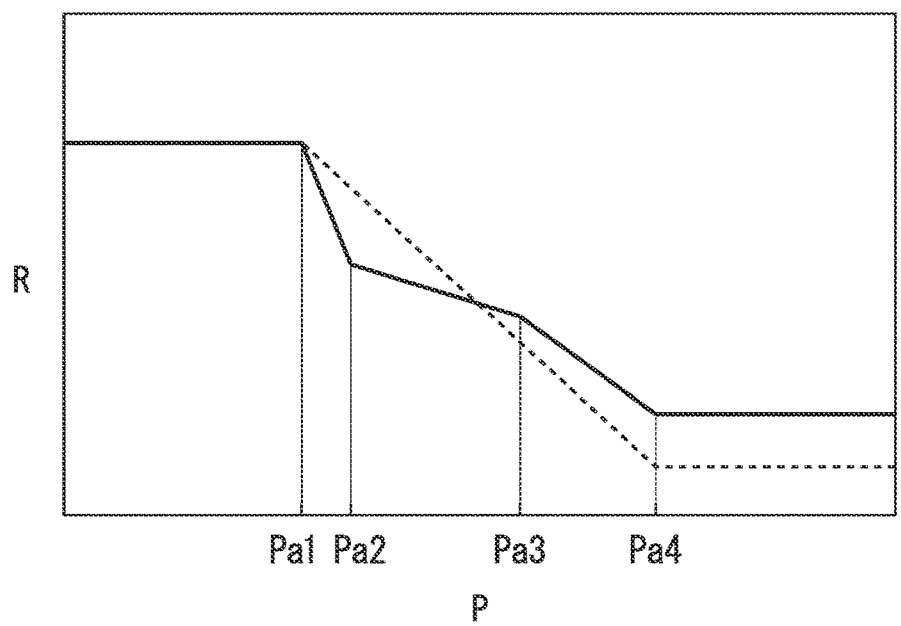
FIG. 5 is a graph showing an outer diameter R of the metering pin of the shock absorber according to the first embodiment of the present invention in an enlarged manner.

FIG. 5 is a graph showing a relationship between the diameter (pin diameter R) of each section of the metering pin 31 and a position (P) in the axial direction. The compression side (a left side of FIG. 5) of an axial direction position Pa1 represents the large diameter shaft section 231. The large diameter shaft section 231 has a constant diameter. The section from the axial direction position Pa1 to an axial direction position Pa2 represents the first tapered shaft section 232. The first tapered shaft section 232 is formed to have such a tapered shape that a second end section (a base valve side, a left side of FIG. 4) is connected to the large diameter shaft section 231 and the diameter is smaller at a position closer to a first end side (a second tapered shaft section 233 side, a right side of FIG. 4). The section from the axial direction position Pa2 to an axial direction position Pa3 represents the second tapered shaft section 233. The second tapered shaft section 233 is formed to have such a tapered shape that a second end section is connected to the first tapered shaft section 232 and the diameter is smaller at a position closer to a first end side. The section from the axial direction position Pa3 to an axial direction position Pa4 represents the third tapered shaft section 234. The third tapered shaft section 234 is formed to have such a tapered shape that a second end section is connected to the second tapered shaft section 233 and the diameter is smaller at a position closer to a first end side. The extension side (a right side of FIG. 5) of an axial direction position Pa4 represents the small diameter shaft section 235. The small diameter shaft section 235 has a constant diameter and has one end section that connects to the third tapered shaft section 234. Accordingly, the small diameter shaft section 235 has a smaller diameter than the large diameter shaft section 231. A taper value is a value obtained by dividing the difference between the large diameter section and the small diameter section by the axial direction length. A taper value of the third tapered shaft section 234 from the axial direction position Pa3 to the axial direction position Pa4 is smaller than a taper value of the first tapered shaft section 232 from the axial direction position Pa1 to the axial direction position Pa2. A taper value of the second tapered shaft section 233 from the axial direction position Pa2 to the axial direction position Pa3 is smaller than a taper value of the third tapered shaft section 234 from the axial direction position Pa3 to the axial direction position Pa4. In other words, with respect to the taper values from the first tapered shaft section 232 to the third tapered shaft section 234, the taper value of the first tapered shaft section 232 is the maximum value, the taper value of the second tapered shaft section 233 is the minimum value, and the taper value of the third tapered shaft section 234 is an intermediate value between the maximum value and the minimum value.

The metering pin 31 is inserted into the insertion hole 30 and the inside of the ring member 302 of the nut 27 as shown in FIG. 2. The insertion hole 30 is configured of the insertion hole 28 and the penetration hole 29 of the piston rod 18. The metering pin 31 forms the rod-inside communication passage 32 between the piston rod 18 and the metering pin 31. The rod-inside communication passage 32 comes into communication with the lower chamber 17 by a gap between the ring member 302 of the nut 27 and the metering pin 31 at a passage area smaller than that of the rod-inside communication passage 32. As a result, the gap between the ring member 302 of the nut 27 and the metering pin 31 is a variable orifice (communication passage) 237. The passage area of the variable orifice 237 varies according to the axial direction position of the relative movement of the metering pin 31 having a varied diameter as described above with respect to the nut 27. In other words, the variable orifice 237 is formed by an inner circumferential section of the ring member 302 and part of the outer circumferential section of the metering pin 31, the part being opposed to an inner circumferential section of the ring member 302. Therefore, the variable orifice 237 is configured such that the passage area is variable according to the displacement of the piston rod 18 with respect to the cylinder 10. That is, the passage area of the variable orifice 237 varies according to the position of the piston rod 18.

Specifically, the passage area of the variable orifice 237 becomes maximally decreased to substantially restrict circulation of the liquid oil when the large diameter shaft section 231 of the metering pin 31 matches a position in the axial direction with the ring member 302. In addition, the passage area of the variable orifice 237 becomes maximally increased to allow the circulation of the liquid oil when the small diameter shaft section 235 of the metering pin 31 matches a position in the axial direction with the ring member 302. In addition, the variable orifice 237 allows the circulation of the liquid oil when the first tapered shaft section 232, the second tapered shaft section 233, and the third tapered shaft section 234 of the metering pin 31 match a position in the axial direction with the ring member 302. Further, the variable orifice 237 is configured such that the passage area increases as the ring member 302 is positioned closer to the small diameter shaft section 235. Additionally, the magnification ratio of the passage area of the variable orifice 237 with respect to the movement amount in the axial direction to the extension side of the ring member 302 is varied depending on the shape of the piston rod 18 from the first tapered shaft section 232 to the third tapered shaft section 234. That is, the maginification ratio is maximized when the ring member 302 moves on the the first tapered shaft section 232 and is minimized when the ring member 302 moves on the second tapered shaft section 233. Further, a maginification ratio when the ring member 302 moves on the the third tapered shaft section 234 is smaller than the maginification ratio when the ring member 302 moves on the the first tapered shaft section 232 and is larger than the maginification ratio when the ring member 302 moves on the the second tapered shaft section 233.

The ring member 302 and the O-ring 303 held by the nut 27, and the metering pin 31 installed on the cylinder 10 side configure a passage area adjustment mechanism (damping force generating device) 238. The passage area adjustment mechanism 238 adjusts the passage area of the variable orifice 237 according to the position of the piston rod 18. In other words, the passage area adjustment mechanism 238 adjusts the passage area of the variable orifice 237 using the metering pin 31.

The relation of the passage area of the variable orifice 237 with respect to a stroke position of the piston rod 18 on the basis of the cylinder 10 is varied by the passage area adjustment mechanism 238. When the piston rod 18 is on the compression side of a minimum length-side predetermined position Sa1 of the compression-side, the ring member 302 matches a position in the axial direction with the large diameter shaft section 231, and the passage area of the variable orifice 237 becomes a minimum constant value. Further, from the minimum length-side predetermined position Sa1 to a first intermediate predetermined position Sa2 of the extension-side, the ring member 302 matches a position in the axial direction with the first tapered shaft section 232, and the passage area of the variable orifice 237 is proportionally increased toward the extension-side. At this time, the passage area of the variable orifice 237 is magnified at a maximum magnification ratio. Further, from the first intermediate predetermined position Sa2 to a second intermediate predetermined position Sa3 of the extension-side, the ring member 302 matches a position in the axial direction with the second tapered shaft section 233, and the passage area of the variable orifice 237 is proportionally increased toward the extension-side. At this time, the passage area of the variable orifice 237 is magnified at a minimum magnification ratio. Further, from the second intermediate predetermined position Sa3 to a maximum length-side predetermined position Sa4 of the extension-side, the ring member 302 matches a position in the axial direction with the third tapered shaft section 234, and the passage area of the variable orifice 237 is proportionally increased toward the extension-side. At this time, the passage area of the variable orifice 237 is magnified at an intermediate magnification ratio between the maximum magnification ratio and the minimum magnification ratio. Further, on the extension side of a maximum length-side predetermined position Sa4, the ring member 302 matches a position in the axial direction with the small diameter shaft section 235, and the passage area of the variable orifice 237 becomes a maximum constant value.

As shown in FIG. 1, the base valve 23 is installed between the bottom section of the outer cylinder 12 and the inner cylinder 11. The base valve 23 has a base valve member 241 having substantially a disk shape, a disk 242, a disk 243, an attachment pin 244, a locking member 245, and a support plate 246. The base valve member 241 is fitted to the lower end of the inner cylinder 11 and partitions the lower chamber 17 and the reservoir chamber 13. The disk 242 is installed at a lower side of the base valve member 241, i.e., installed near the reservoir chamber 13. The disk 243 is installed at an upper side of the base valve member 241, i.e., installed near the lower chamber 17. The attachment pin 244 attaches the disk 242 and the disk 243 to the base valve member 241. The locking member 245 is mounted on an outer circumferential side of the base valve member 241. The support plate 246 sandwiches the support flange section 230 of the metering pin 31 between the base valve member 241 and the support plate 246. The attachment pin 244 sandwiches central sides in the radial direction of the disk 242 and the disk 243 between the attachment pin 244 and the base valve member 241.

The base valve member 241 has a pin insertion hole 248 formed outside the pin insertion hole 248 at a center in the radial direction and through which the attachment pin 244 is inserted. The base valve member 241 has a plurality of passage holes 249 formed outside the passage holes 249 and configured to allow the liquid oil to flow between the lower chamber 17 and the reservoir chamber 13. The base valve member 241 has a plurality of passage holes 250 formed to allow the liquid oil to flow between the lower chamber 17 and the reservoir chamber 13. The disk 242 near the reservoir chamber 13 allows a flow of the liquid oil from the lower chamber 17 into the reservoir chamber 13 via the passage hole 249 of an inner side. On the other hand, the disk 242 near the reservoir chamber 13 restricts a flow of the liquid oil from the reservoir chamber 13 into the lower chamber 17 via the passage hole 249 of the inner side. The disk 243 allows a flow of the liquid oil from the reservoir chamber 13 into the lower chamber 17 via the passage hole 250 of the outer side. On the other hand, the disk 243 restricts a flow of the liquid oil from the lower chamber 17 into the reservoir chamber 13 via the passage hole 250 of the outer side.

The disk 242 and the base valve member 241 configure a damping valve 252 of the compression-side. The damping valve 252 of the compression-side opens the valve at the compression stroke to allow the liquid oil to flow from the lower chamber 17 into the reservoir chamber 13 and generates a damping force. The disk 243 and the base valve member 241 configure a suction valve 253. The suction valve 253 opens the valve at the extension stroke and allows the liquid oil to flow from the reservoir chamber 13 into the lower chamber 17. Further, the suction valve 253 functions to allow flow of the liquid without substantially generating the damping force from the lower chamber 17 to the reservoir chamber 13 such that extra liquid generated mainly by advancement of the piston rod 18 into the cylinder 10 is discharged, from a relation with the damping force generating mechanism 115 of the compression-side installed at the piston 15.

The locking member 245 has a tubular shape, and the base valve member 241 is fitted into the inside thereof. The base valve member 241 is fitted into the inner circumferential section of the lower end of the inner cylinder 11 via the locking member 245. A locking flange section 255 extending inward in the radial direction is formed at the end section of the locking member 245 near the piston 15. An outer circumferential section of the support plate 246 is locked to a section opposite to the piston 15 in the locking flange section 255. An inner circumferential section of the support plate 246 is locked to the support flange section 230 in the metering pin 31 at a side near the piston 15. Accordingly, the locking member 245 and the support plate 246 hold the support flange section 230 of the metering pin 31 in a state of abutting the attachment pin 244. As a result, the support flange section 230 on one end side of the metering pin 31 is fixed to the cylinder 10.

Figure 6:
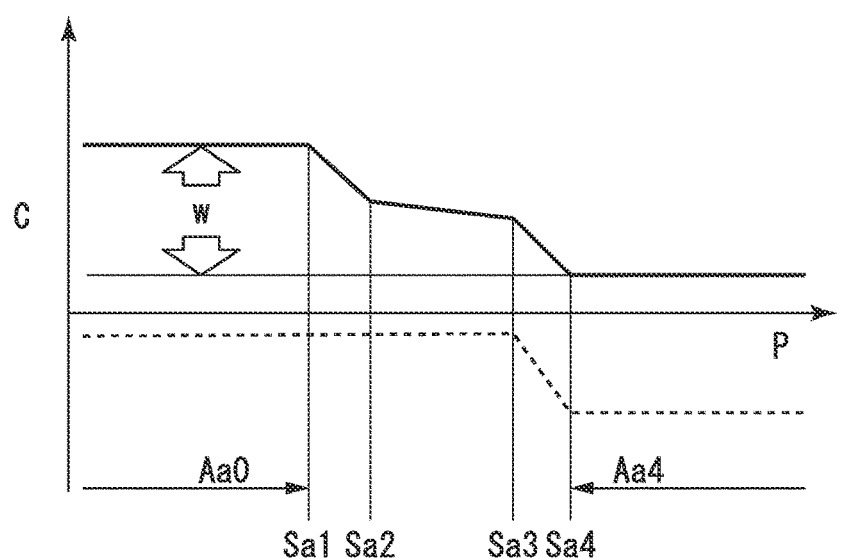
FIG. 6 is a graph showing a relationship between a stroke position P and a damping coefficient C of the piston rod of the shock absorber according to the first embodiment of the present invention.

The shock absorber 1 according to the first embodiment does not shrink the rebound spring 38 in a minimum length-side predetermined range Aa0 in which the piston rod 18 is pressed into the inside of the cylinder 10 further than the minimum length-side predetermined position Sa1 shown in FIG. 6 with respect to the cylinder 10. As shown at the right side of the centerline of FIGS. 2 and 3, the passage area adjustment mechanism 101 separates the opening/closing disk 86 from the abutting disk 88 to maximize the passage area of the orifice 98 of the communication passage 99 without being pressed by the spring mechanism 100 including the rebound spring 38. In addition, in the minimum length-side predetermined range Aa0, the passage area adjustment mechanism 238 matches the ring member 302 at a position in the axial direction of the large diameter shaft section 231 of the metering pin 31 to substantially close the variable orifice 237. In the minimum length-side predetermined range Aa0, the rod-inside communication passage 32 comes into communication with the upper chamber 16 via the communication passage 99. Further, in the minimum length-side predetermined range Aa0, the pilot chamber 140 of the damping force generating mechanism 114 of the extension-side and the pilot chamber 200 of the damping force generating mechanism 115 of the compression-side come in common communication with the upper chamber 16 via the rod-inside communication passage 32.

In the minimum length-side predetermined range Aa0, in the extension stroke in which the piston rod 18 is drawn toward the outside of the cylinder 10, the piston 15 moves toward the upper chamber 16, the pressure of the upper chamber 16 is increased, and the pressure of the lower chamber 17 is decreased. Then, the pressure of the upper chamber 16 is applied to the damping valve main body 122 of the damping valve 147 of the damping force generating mechanism 114 of the extension-side via the communication passage 111 of the extension-side formed in the piston 15. At this time, the pilot chamber 140 comes into communication with the upper chamber 16 via the communication passage 99, the rod-inside communication passage 32, and the pilot chamber introduction passage 141. Since the pilot chamber 140 applies a pilot pressure to the damping valve main body 122 in a direction of the seat section 117, the pilot pressure becomes similar to a pressure of the upper chamber 16, and the pilot pressure also increases with an increase in pressure of the upper chamber 16.

In this state, when the piston speed is low, the increase in pressure of the pilot chamber 140 can follow the increase in pressure of the upper chamber 16. Therefore, the damping valve main body 122 is reduced in the received pressure difference and cannot be easily separated from the seat section 117. Accordingly, the liquid oil from the upper chamber 16 flows to the lower chamber 17 from the communication passage 99, the rod-inside communication passage 32, and the pilot chamber introduction passage 141 through the pilot chamber 140 via the orifice 154 of the plurality of disks 125 of the disc valve 153, and a damping force of orifice properties (the damping force is substantially in proportion to a square of the piston speed) is generated. For this reason, in properties of the damping force with respect to the piston speed, the rate of increase of the damping force is increased relative to an increase in piston speed.

In addition, even when the piston speed is increased more than the above, the damping valve main body 122 is not separated from the seat section 117. The liquid oil from the upper chamber 16 flows to the lower chamber 17 from the communication passage 99, the rod-inside communication passage 32, and the pilot chamber introduction passage 141 through the pilot chamber 140 and flows through a space between the seat section 137 and the plurality of disks 125 while opening the plurality of disks 125 of the disc valve 153, and a damping force of valve characteristics (the damping force is substantially proportional to the piston speed) is generated. For this reason, in the properties of the damping force with respect to the piston speed, a rate of increase of the damping force is slightly decreased with respect to the increase in piston speed. As described above, in the minimum length-side predetermined range Aa0, an extension-side damping coefficient that indicates the damping force of the extension stroke shown by a solid line in FIG. 6 becomes an extension-side hard state in which the extension-side damping coefficient is high, is substantially constant, and is hard.

In addition, in the minimum length-side predetermined range Aa0, at the compression stroke in which the piston rod 18 is pushed into the inside of the cylinder 10, the piston 15 moves toward the lower chamber 17, the pressure of the lower chamber 17 is increased, and the pressure of the upper chamber 16 is decreased. Then, the hydraulic pressure of the lower chamber 17 is applied to the damping valve main body 182 of the damping valve 207 of the damping force generating mechanism 115 of the compression-side via the communication passage 112 of the compression-side formed in the piston 15. Here, the pilot chamber 200 configured to apply the pilot pressure in the direction of the seat section 118 to the damping valve main body 182 comes into communication with the upper chamber 16 via the communication passage 99, the rod-inside communication passage 32, and the pilot chamber introduction passage 201. Therefore, the pressure state of the pilot chamber 200 becomes similar to that of the upper chamber 16, and the pilot pressure is decreased. Accordingly, the damping valve main body 182 has a received pressure difference, which is increased, is opened to be relatively easily separated from the seat section 118, and allows the liquid oil to flow toward the upper chamber 16 side via the passage 208 in the radial direction between the piston 15 and the seat member 184. As described above, in the minimum length-side predetermined range Aa0, a compression-side damping coefficient that indicates the damping force of the compression stroke shown by a broken line in FIG. 6 becomes a soft state in which the compression-side damping coefficient is low and is substantially constant.

As described above, in the minimum length-side predetermined range Aa0, the piston rod 18 is pressed into the inside of the cylinder 10 further than the minimum length-side predetermined position Sa1. The minimum length-side predetermined range Aa0 has minimum length-side properties in which the extension-side damping coefficient signifies the extension-side hard state where the extension-side damping coefficient is hard as shown by the solid line in FIG. 6 and the compression-side damping coefficient signifies the soft state as shown by the broken line in FIG. 6.

Further, in a maximum length-side predetermined range Aa4, the piston rod 18 extends to the outside of the cylinder 10 further than the maximum length-side predetermined position Sa4 with respect to the cylinder 10. In the maximum length-side predetermined range Aa4, the shock absorbing body 39 abuts the rod guide 21, and the spring mechanism 100 including the rebound spring 38 is decreased in length. Accordingly, as shown at a left side of the centerline of FIGS. 2 and 3, the passage area adjustment mechanism 101 collapses the wave spring 72 by the transmission member 71 of the spring mechanism 100 to bring the opening/closing disk 86 in contact with the abutting disk 88 to close the communication passage 99. In addition, in the maximum length-side predetermined range Aa4, the passage area adjustment mechanism 238 matches the ring member 302 at a position in the axial direction of the small diameter shaft section 235 of the metering pin 31 to maximize the passage area of the variable orifice 237. In the maximum length-side predetermined range Aa4, the rod-inside communication passage 32 comes into communication with the lower chamber 17 via the variable orifice 237. Further, in the maximum length-side predetermined range Aa4, the pilot chamber 140 of the damping force generating mechanism 114 of the extension-side and the pilot chamber 200 of the damping force generating mechanism 115 of the compression-side come into communication with the lower chamber 17 via the variable orifice 237, the rod-inside communication passage 32, and the pilot chamber introduction passages 141 and 201.

In the maximum length-side predetermined range Aa4, in the extension stroke in which the piston rod 18 is drawn toward the outside of the cylinder 10, the piston 15 moves toward the upper chamber 16, the pressure of the upper chamber 16 is increased, and the pressure of the lower chamber 17 is decreased. Then, the pressure of the upper chamber 16 is applied to the damping valve main body 122 of the damping force generating mechanism 114 of the extension-side via the communication passage 111 of the extension-side formed in the piston 15. Here, the pilot chamber 140 comes into communication with the lower chamber 17 via the variable orifice 237, the rod-inside communication passage 32, and the pilot chamber introduction passage 141. Since the pilot chamber 140 applies pilot pressure to the damping valve main body 122 in a direction of the seat section 117, the pilot pressure becomes similar to the pressure of the lower chamber 17, and the pilot pressure is decreased. Accordingly, the damping valve main body 122 is increased in the received pressure difference and is opened to be relatively easily separated from the seat section 117. As a result, the damping valve main body 122 allows the liquid oil to flow toward the lower chamber 17 via the passage 148 in the radial direction between the piston 15 and the seat member 124. Accordingly, the damping force is decreased. As described above, in the maximum length-side predetermined range Aa4, the extension-side damping coefficient of the extension stroke shown by the solid line in FIG. 6 becomes an extension-side soft state in which the extension-side damping coefficient is low and soft. The difference between the damping coefficient of the minimum length-side predetermined range Aa0 and the damping coefficient of the maximum length-side predetermined range Aa4 is a damping coefficient variable width w.

In addition, in the maximum length-side predetermined range Aa4, in the compression stroke in which the piston rod 18 is pressed into the inside of the cylinder 10, the piston 15 moves toward the lower chamber 17, the pressure of the lower chamber 17 is increased, and the pressure of the upper chamber 16 is decreased. Then, the hydraulic pressure of the lower chamber 17 is applied to the damping valve main body 182 of the damping valve 207 of the damping force generating mechanism 115 of the compression-side via the communication passage 112 of the compression-side formed at the piston 15. Here, the pilot chamber 200 comes into communication with the lower chamber 17 via the variable orifice 237, the rod-inside communication passage 32, and the pilot chamber introduction passage 201. Since the pilot chamber 200 applies a pilot pressure to the damping valve main body 182 in a direction of the seat section 118, the pilot pressure becomes similar to the pressure of the lower chamber 17, and the pilot pressure also increases with an increase in pressure of the lower chamber 17.

In this state, when the piston speed is low, the increase in pressure of the pilot chamber 200 can follow the increase in pressure of the lower chamber 17. Therefore, the damping valve main body 182 is reduced in the received pressure difference and cannot be easily separated from the seat section 118. Accordingly, the liquid oil from the lower chamber 17 flows to the upper chamber 16 from the variable orifice 237, the rod-inside communication passage 32, and the pilot chamber introduction passage 201 through the pilot chamber 200 via the orifice 214 of the plurality of disks 185 of the disc valve 213, and a damping force of orifice properties (the damping force is substantially in proportion to a square of the piston speed) is generated. For this reason, in properties of the damping force with respect to the piston speed, the rate of increase of the damping force is increased relative to an increase in piston speed.

In addition, even when the piston speed is increased more than the above, the damping valve main body 182 cannot be easily separated from the seat section 118. Therefore, the liquid oil from the lower chamber 17 flows to the upper chamber 16 from the variable orifice 237, the rod-inside communication passage 32, and the pilot chamber introduction passage 201 through the pilot chamber 200 and flows through a space between the seat section 197 and the plurality of disks 185 while opening the plurality of disks 185 of the disc valve 213, and a damping force of valve characteristics (the damping force is substantially proportional to the piston speed) is generated. For this reason, in the properties of the damping force with respect to the piston speed, a rate of increase of the damping force is slightly decreased with respect to the increase in piston speed. As described above, the compression-side damping coefficient of the compression stroke is increased in comparison with the extension-side damping coefficient, and the compression-side damping coefficient signifies a hard state.

Even in the compression stroke of the maximum length-side predetermined range, upon generation of an impact shock or the like generated due to a step difference of the road surface or the like, when the piston speed is in a higher speed region, the increase in pressure of the pilot chamber 200 cannot follow the increase in pressure of the lower chamber 17. At this time, a force due to the pressure difference applied to the damping valve main body 182 of the damping valve 207 of the damping force generating mechanism 115 of the compression-side has a relation in which a force in the opening direction applied from the communication passage 112 formed in the piston 15 is larger than a force in the closing direction applied from the pilot chamber 200. Accordingly, in this region, since the damping valve 207 is opened depending on the increase in piston speed and the damping valve main body 182 is separated from the seat section 118, and the liquid oil flows into the upper chamber 16 via the passage 208 in the radial direction between the piston 15 and the seat member 184 in addition to the flow of the liquid oil into the upper chamber 16 passing between the seat section 197 of the disc valve 213 and the plurality of disks 185, an increase in damping force can be limited. In the properties of the damping force with respect to the piston speed at this time, the rate of increase of the damping force with respect to the increase in piston speed is little. Accordingly, upon generation of the impact shock or the like generated due to the step difference of the road surface or the like at which the piston speed is high and the frequency is relatively high, as the increase in damping force with respect to the increase in piston speed is limited as described above, the shock is sufficiently absorbed.

As described above, the maximum length-side predetermined range Aa4 has maximum length-side properties in which the extension-side damping coefficient signifies the extension-side soft state where the extension-side damping coefficient is soft as shown by the solid line in FIG. 6 and the compression-side damping coefficient signifies the hard state as shown by the broken line in FIG. 6.

Then, when the piston rod 18 is in the intermediate predetermined range Sa1 to Sa4 between the minimum length-side predetermined position Sa1 and the maximum length-side predetermined position Sa4 with respect to the cylinder 10, the shock absorber 1 has properties in which the extension-side damping coefficient signifies a state of being varied between the extension-side hard state and the extension-side soft state.

In the intermediate predetermined ranges Sa1 to Sa4, similar to the minimum length-side predetermined range Aa0, the rebound spring 38 is not decreased in length, and the passage area adjustment mechanism 101 maximizes the passage area of the orifice 98 of the communication passage 99. In addition, in the intermediate predetermined ranges Sa1 to Sa4, the ring member 302 matches a position in the axial direction with any of the first tapered shaft section 232, the second tapered shaft section 233, and the third tapered shaft section 234 of the metering pin 31, and the passage area adjustment mechanism 238 opens the variable orifice 237. Further, the piston rod 18 widely opens the variable orifice 237 as the piston rod 18 is positioned closer to the maximum length-side predetermined position Sa4 and farther from the minimum length-side predetermined position Sa1. In the intermediate predetermined ranges Sa1 to Sa4, the rod-inside communication passage 32 comes into communication with the upper chamber 16 via the communication passage 99 and comes into communication with the lower chamber 17 via the variable orifice 237. The pilot chamber 140 of the damping force generating mechanism 114 of the extension-side comes into communication with the upper chamber 16 and the lower chamber 17. Further, the communication amount of the pilot chamber 140 to the lower chamber 17 decreases as the piston rod 18 is closer to the minimum length-side predetermined position Sa1, and the communication amount of the pilot chamber 140 to the lower chamber 17 increases as the piston rod 18 is closer to the the maximum length-side predetermined position Sa4.

At the extension stroke in which the piston rod 18 is in the intermediate predetermined ranges Sa1 to Sa4 and is drawn to the outside of the cylinder 10, the piston 15 moves toward the upper chamber 16, the pressure of the upper chamber 16 is increased, and the pressure of the lower chamber 17 is decreased. Then, the pressure of the upper chamber 16 is applied to the damping valve main body 122 of the damping valve 147 of the damping force generating mechanism 114 of the extension-side via the communication passage 111 of the extension-side formed at the piston 15. At this time, the pilot chamber 140 configured to apply the pilot pressure in the direction of the seat section 117 to the damping valve main body 122 comes into communication with the upper chamber 16 via the communication passage 99, the rod-inside communication passage 32, and the pilot chamber introduction passage 141 and comes into communication with the lower chamber 17 via the variable orifice 237. Therefore, the pressure of the pilot chamber 140 becomes smaller than the pressure when the piston rod 18 is in the minimum length-side predetermined range Aa0 where the pilot chamber 140 does not come into communication with the lower chamber 17, and the pilot pressure is decreased. Accordingly, the damping valve main body 122 is increased in the received pressure difference compared to a case where the piston rod 18 is in the minimum length-side predetermined range Aa0 and is easily separated from the seat section 117. As a result, the liquid oil flows toward the lower chamber 17 via the passage 148 in the radial direction between the piston 15 and the seat member 124. Accordingly, the damping force is decreased. Additionally, the liquid oil flows from the upper chamber 16 to the lower chamber 17 via the communication passage 99, the rod-inside communication passage 32, and the variable orifice 237. Thereby, the damping force is also decreased.

According to the above, when the piston rod 18 is in the intermediate predetermined ranges Sa1 to Sa4, the damping force is decreased as the passage area of the variable orifice 237 is increased. The taper value of the metering pin 31 that determines the passage area of the variable orifice 237 is maximized at the first tapered shaft section 232, is minimized at the second tapered shaft section 233, and is an intermediate value between the maximum value and the minimum value at the third tapered shaft section 234. Therefore, the magnification ratio of the passage area of the variable orifice 237 with respect to the movement amount in the axial direction to the extension side of the ring member 302 installed at the piston rod 18 is maximized when the ring member 302 moves on the the first tapered shaft section 232, that is, when the piston rod 18 moves from the minimum length-side predetermined position Sa1 to the first intermediate predetermined position Sa2. The magnification ratio of the passage area is minimized when the ring member 302 moves on the the second tapered shaft section 233, that is, when the piston rod 18 moves from the first intermediate predetermined position Sa2 to the second intermediate predetermined position Sa3. The magnification ratio of the passage area is an intermediate value between the maximum value and the minimum value when the ring member 302 moves on the the third tapered shaft section 234, that is, when the piston rod 18 moves from the second intermediate predetermined position Sa3 to the maximum length-side predetermined position Sa4.

As a result, extension-side damping force properties when the piston rod 18 is in the intermediate predetermined ranges Sa1 to Sa4 include a part in which a damping coefficient change rate with respect to a stroke of the piston rod 18 is large and a part in which the damping coefficient change rate is small. Specifically, a damping coefficient change rate α a2 when the piston rod 18 is in the second intermediate predetermined range Sa2 to Sa3 from the first intermediate predetermined position Sa2 to the second intermediate predetermined position Sa3 is smaller than a damping coefficient change rate α a1 when the piston rod 18 is in the first intermediate predetermined range Sa1 to Sa2 from the minimum length-side predetermined position Sa1 to the first intermediate predetermined position Sa2. Further, a damping coefficient change rate α a3 when the piston rod 18 is in the third intermediate predetermined range Sa3 to Sa4 from the second intermediate predetermined position Sa3 to the maximum length-side predetermined position Sa4 is smaller than the damping coefficient change rate α a1 and is larger than the damping coefficient change rate α a2. The stroke range Sa2 to Sa3 of the damping coefficient change rate α a2 which is small is wider than a range obtained by combining the stroke range Sa1 to Sa2 of the damping coefficient change rate α a1 which is larger than the damping coefficient change rate α a2 with the stroke range Sa3 to Sa4 of the damping coefficient change rate α a3 which is larger than the damping coefficient change rate α a2. Additionally, in the second intermediate predetermined range Sa2 to Sa3 in which the small damping coefficient change rate α a2 can be obtained, the damping coefficient C is determined such that a proportion (ratio) C/Cc of the damping coefficient C to a critical damping coefficient Cc becomes constant with respect to the change in a mass added to the piston rod 18 or the cylinder 10. When a spring constant is k and a mass is w, the critical damping coefficient Cc is $2\sqrt{(k \cdot w)}$, and therefore depends on the mass. With respect to this, the damping coefficient C is adjusted such that the the proportion C/Cc becomes constant. The adjustment is performed by varying the diameter of the metering pin 31.

The shock absorber 1 according to the first embodiment can obtain the above-mentioned position-sensitive damping force variation properties.

Figure 7:
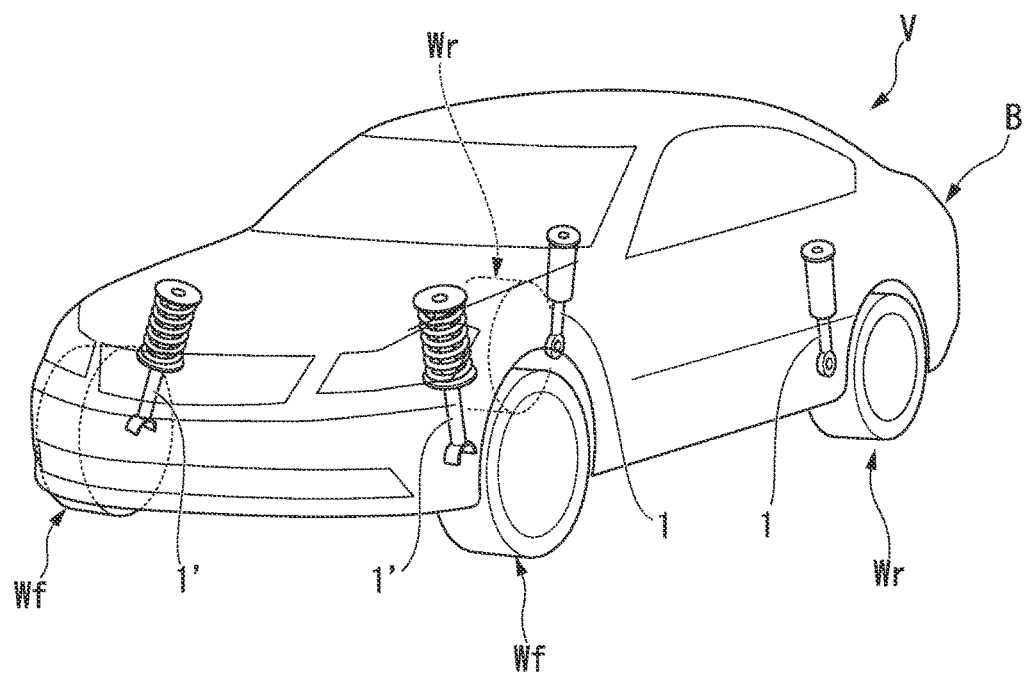
FIG. 7 is a transmittive perspective view schematically showing a vehicle provided with the shock absorber according to the first embodiment of the present invention.

In the first embodiment, as shown in FIG. 7, the shock absorber 1 is attached only to two rear wheels Wr of two front wheels Wf and the two rear wheels Wr supporting a vehicle body B of a vehicle V, between the vehicle body B and the rear wheels Wr. That is, a shock absorber 1' which is different from the shock absorber 1 is attached to the two front wheels Wf between the vehicle body B and the front wheels Wf. The shock absorber 1 according to the present embodiment is set such that when the shock absorber 1 is in a 1G position where the shock absorber 1 supports the vehicle body B stopped at a horizontal position without passengers and loads, the piston rod 18 is in the second intermediate predetermined range Sa2 to Sa3 between the first intermediate predetermined position Sa2 and the second intermediate predetermined position Sa3, and the ring member 302 is in an intermediate position of the second tapered shaft section 233. That is, the shock absorber 1 is set such that when the shock absorber 1 is in the 1G position, the piston rod 18 is in the second intermediate predetermined range Sa2 to Sa3 having the smallest damping coefficient change rate α a2 of the damping coefficient change rates α a1 to α a3.

The shock absorber disclosed in the above-mentioned Patent Literatures 1 and 2 is a position-sensitive shock absorber and is configured such that a spring load of the spring is directly applied to the disc valve configured to open/close the passage formed in the piston to increase a valve opening pressure. Therefore, two springs are needed at the extension-side and the compression-side such that the damping force can be adjusted at the position of the extension-side and the position of the compression-side. In addition, in order to increase the damping force variable width, the spring rate should be increased. However, when the spring rate is increased, application of a spring reaction force is also increased. The stroke of the piston rod 18 is reduced while the damping force is abruptly varied, and ride comfort of the shock-absorber-mounted vehicle is degraded. In addition, increasing the damping force variable width and reducing the reaction force cannot be performed, and properties of the shock absorber cannot be freely designed.

On the other hand, the shock absorber according to the above-mentioned first embodiment includes the passage area adjustment mechanism 101 configured to adjust the passage area of the orifice 98 according to the position of the piston rod 18 and the passage area adjustment mechanism 238 configured to adjust the passage area of the variable orifice 237 according to the position of the piston rod 18. Therefore, in the minimum length-side predetermined range Aa0 in which the piston rod 18 is pressed further into the inside of the cylinder 10 than the minimum length-side predetermined position Sa1, the minimum length-side properties in which the extension-side damping coefficient signifies the extension-side hard state in which the extension-side damping coefficient is hard and the compression-side damping coefficient signifies the soft state can be obtained by the passage area adjustment mechanism 101 and the passage area adjustment mechanism 238. Further, in the maximum length-side predetermined range Aa4 in which the piston rod 18 extends further outside of the cylinder 10 than the maximum length-side predetermined position Sa4, the maximum length-side properties in which the extension-side damping coefficient signifies the extension-side soft state in which the extension-side damping coefficient is soft and the compression-side damping coefficient signifies the hard state can be obtained by the passage area adjustment mechanism 101 and the passage area adjustment mechanism 238. In this way, since the passage areas of the orifices 98 and 237 through which the liquid oil flows are adjusted, the damping force can be smoothly varied, and the ride comfort of the shock-absorber-mounted vehicle improves.

In addition, even in a design step, in the passage area adjustment mechanism 101, the damping force properties can be adjusted by varying only the properties of the opening/closing disk 86 or an area of the notch 87A of the intermediate disk 87 without varying the spring rate of the rebound spring 38 while the reaction force properties are hardly varied. In addition, in the passage area adjustment mechanism 238, as the profile of the metering pin 31 is varied, the damping force properties can be varied without varying the reaction force properties. Accordingly, the degree of design freedom is increased, and tuning of the damping properties can also be easily performed. The following embodiments also have the same effects.

In addition, as the maximum length-side properties and the minimum length-side properties are obtained, a force used to excite the spring can be reduced (i.e., soft), a force used to dampen the spring can be increased (i.e., hard), and high quality ride comfort such as skyhook control can be obtained without using electronic control.

As shown by a broken line in FIG. 5, the end section position Pa1 on the small diameter shaft section 235 side of the large diameter shaft section 231 of the piston rod 18 is connected to the end section position Pa4 on the large diameter shaft section 231 side of the small diameter shaft section 235 by a tapered surface having a constant taper value, and the 1G position is set in the range of constant change rate. As a result, when the piston rod 18 is between the minimum length-side predetermined position Sa1 and the maximum length-side predetermined position Sa4, the extension-side damping coefficient at the minimum length-side predetermined position Sa1 and the extension-side damping coefficient at the maximum length-side predetermined position Sa4 are connected to each other at a constant change rate, and the 1G position is set in the range of constant change rate. That is, the extension-side hard state and the extension-side soft state are connected to each other at a constant change rate, and the 1G position is set within the constant change rate. According to such a setting, when the number of passengers and the load weight are varied and the shock absorber is extended or retracted, the damping coefficient is greatly varied, and changes in properties of the ride comfort of the shock-absorber-mounted vehicle V and steering stability increase. Further, since the change in damping force increases even when the shock absorber 1 is slightly actuated, vibration control properties and response properties in both roll and pitch directions are degraded, and steering stability is degraded even during light steering on good roads.

On the other hand, in the present embodiment, as shown by FIG. 4 and a solid line of FIG. 5, the large diameter shaft section 231 of the piston rod 18 is connected to the small diameter shaft section 235 by the first tapered shaft section 232 having a maximum taper value, the second tapered shaft section 233 having a minimum taper value, and the third tapered shaft section 234 having an intermediate taper value. As a result, as shown by a solid line in FIG. 6, when the piston rod 18 is in intermediate predetermined ranges Sa1 to Sa4 between the minimum length-side predetermined position Sa1 and the maximum length-side predetermined position Sa4, the shock absorber 1 has the extension-side damping force properties in which the extension-side damping coefficient signifies a state of varying between the extension-side hard state and the extension-side soft state. The extension-side damping force properties include a part in which a damping coefficient change rate with respect to a stroke of the piston rod 18 is large and a part in which the damping coefficient change rate is small. The extension-side damping force properties become a large damping coefficient change rate $\alpha$ a1 at an initial stage when the piston rod 18 strokes to the extension side from the minimum length-side predetermined position Sa1, i.e., in the first intermediate predetermined range Sa1 to Sa2 from the minimum length-side predetermined position Sa1 to the first intermediate predetermined position Sa2. Therefore, a damping coefficient change rate $\alpha$ a2 which is smaller than the damping coefficient change rate $\alpha$ a1 can be set in the second intermediate predetermined range Sa2 to Sa3 from the first intermediate predetermined position Sa2 to the second intermediate predetermined position Sa3, which follows the first intermediate predetermined range Sa1 to Sa2. Then, by setting the 1G position in the second intermediate predetermined range Sa2 to Sa3 having the damping coefficient change rate $\alpha$ a2, the damping coefficient change rate at the 1G position can be a small damping coefficient change rate $\alpha$ a2. Accordingly, even when the number of passengers and the load weight are varied, it is possible to limit changes in properties of the ride comfort of the shock-absorber-mounted vehicle V and steering stability. Further, since the change in damping force becomes small when the shock absorber 1 is slightly actuated, vibration control properties and response properties in both roll and pitch directions are improved even in slight steering in a good road. With respect to steering stability, when the damping coefficient change rate at the 1G position is large, flotation on the spring at the rotation inside (a side of stroking in the extension direction) in response to a steering input becomes noticeable, and the roll amount increases. However, as the damping coefficient change rate at the 1G position is made to be a small damping coefficient change rate $\alpha$ a2, it is possible to adequately limit flotation on the spring at the rotation inside, and steering stability can be improved. That is, it is possible to obtain ride comfort of skyhook control in a rough road while ensuring steering stability and ride comfort of a conventional shock absorber in a good road where an input is small. The damping coefficient change rate α a2 may be 0. In this case, steering stability and ride comfort similar to a conventional shock absorber is obtained on good roads, and it is possible to vary the damping coefficient only on rough roads.

Further, the stroke range Sa2 to Sa3 having the damping coefficient change rate α a2 which is small is wider than a range obtained by combining the stroke range Sa1 to Sa2 of the damping coefficient change rate α a1 which is larger than the damping coefficient change rate α a2 with the stroke range Sa3 to Sa4 of the damping coefficient change rate α a3 which is larger than the damping coefficient change rate α a2. Therefore, even when changes in the number of passengers and the load weight are relatively large, it is possible to limit changes in properties of the ride comfort of the shock-absorber-mounted vehicle V and steering stability. This applies similarly to the second embodiment and the third embodiment described below.

Further, the damping coefficient C in the small damping coefficient change rate α a2 is determined such that a proportion C/Cc of the damping coefficient C to a critical damping coefficient Cc becomes constant with respect to the change in a mass added to the piston rod 18 or the cylinder 10. Therefore, it is possible to further limit changes in properties of the ride comfort of the shock-absorber-mounted vehicle V and steering stability against changes in the number of passengers and the load weight. This applies similarly to the second embodiment and the third embodiment described below.

Further, the passage area adjustment mechanism 238 configured to adjust the passage area of the variable orifice 237 that is a communication passage according to the position of the piston rod 18 is used. Therefore, it is possible to easily adjust in detail the damping force properties as described above according to the position of the piston rod 18. This applies similarly to the second embodiment described below.

Further, the above-described shock absorber 1 is used only in the rear wheels Wr which is greatly subject to effects of changes in the number of passengers and the load weight, of the front wheels Wf and the rear wheels Wr. Therefore, it is possible to effectively limit changes in properties of the ride comfort of the shock-absorber-mounted vehicle V and steering stability. This applies similarly to the second embodiment and the third embodiment described below.

Round chamfering may be applied to at least any one of a boundary outer circumferential section of the large diameter shaft section 231 and the first tapered shaft section 232, a boundary outer circumferential section of the first tapered shaft section 232 and the second tapered shaft section 233, a boundary outer circumferential section of the second tapered shaft section 233 and the third tapered shaft section 234, and a boundary outer circumferential section of the third tapered shaft section 234 and the small diameter shaft section 235. Thereby, when the change rate of damping coefficient is varied, the damping coefficient can be smoothly varied. This applies similarly to the second embodiment described below.

Second Embodiment

Next, the second embodiment is described focusing on different parts from the first embodiment mainly based on FIGS. 8 to 12. Parts common to the first embodiment are provided with the same names and the same reference numerals.

Figure 8:
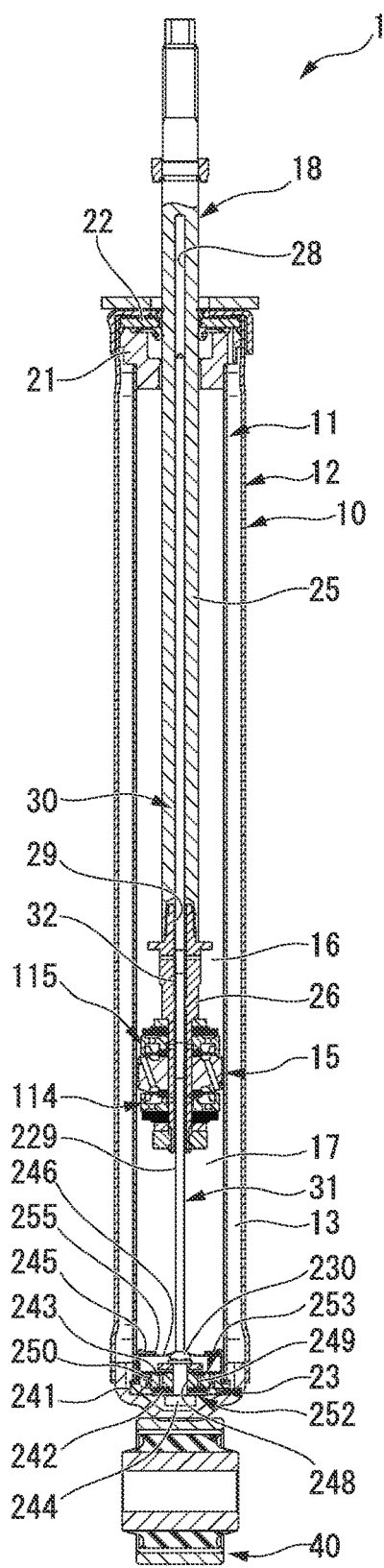
FIG. 8 is a cross-sectional view showing a shock absorber according to a second embodiment of the present invention.
Figure 9:
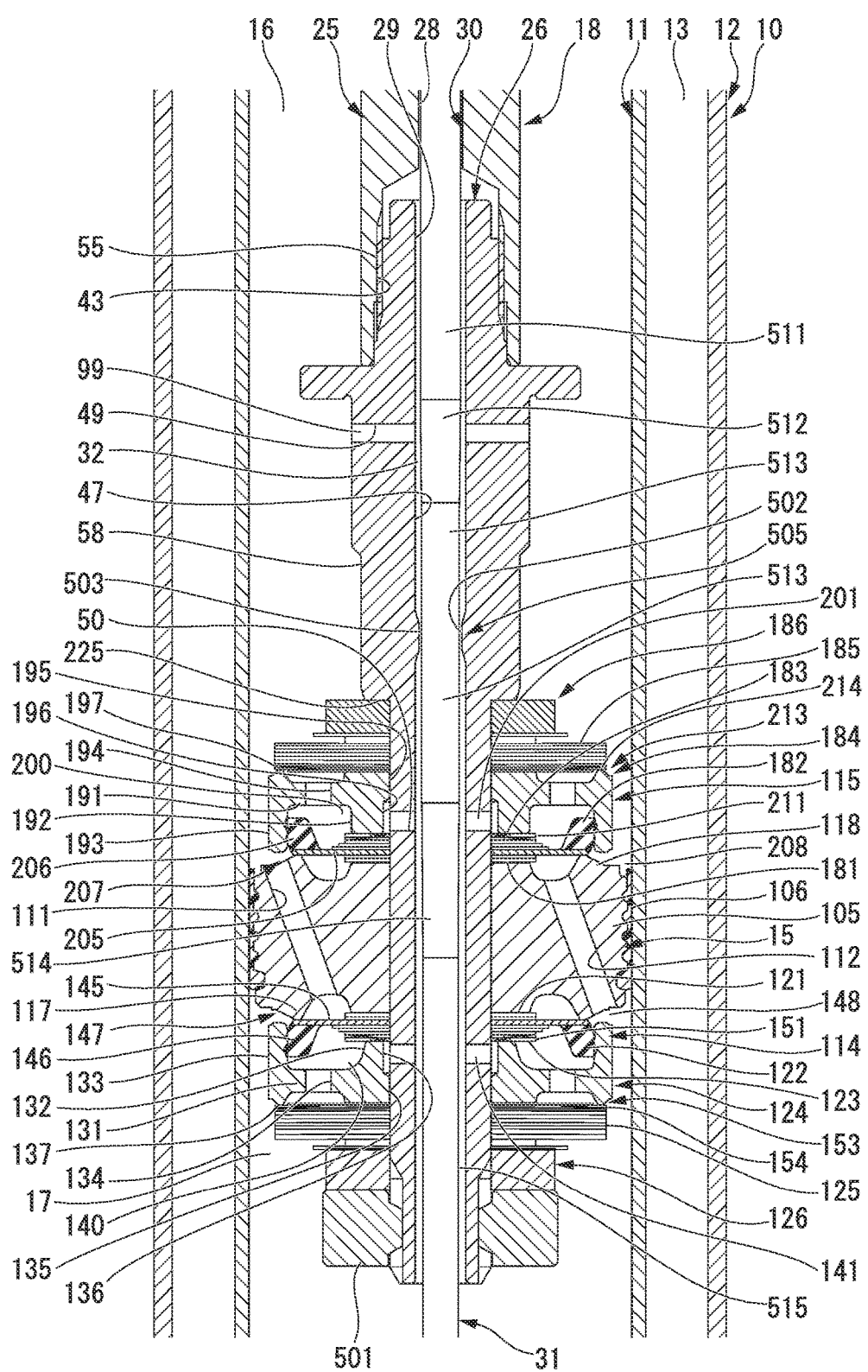
FIG. 9 is a cross-sectional view showing a major part of the shock absorber according to the second embodiment of the present invention.

In the second embodiment shown in FIG. 8, the spring mechanism 100 and the passage area adjustment mechanism 101 of the first embodiment shown in FIG. 1 are not installed, and as shown in FIG. 9, the passage hole 49 always comes in contact with the upper chamber 16. In addition, the small diameter hole section 48 of the first embodiment shown in FIG. 2 is not formed in the tip end rod 26, and this section is also the large diameter hole section 47. Additionally, the nut 27 that configures the variable orifice 237 of the first embodiment shown in FIG. 2 is not installed, and a nut 501 is installed in place of the nut 27. An annular protruding section 502 that protrudes inward in the radial direction is formed between the passage hole 49 and the passage hole 50 of the large diameter hole section 47 of the tip end rod 26. The annular protruding section 502 forms a variable orifice 503 that becomes part of the rod-inside communication passage 32 between the metering pin 31 and the annular protruding section 502. The annular protruding section 502 and the metering pin 31 configure a passage area adjustment mechanism (damping force generating device) 505. The passage area adjustment mechanism 505 adjusts the passage area of the variable orifice 503 that becomes part of the rod-inside communication passage 32 according to the position of the piston rod 18. In other words, the passage area adjustment mechanism 505 adjusts the passage area of the variable orifice 503 by using the metering pin 31.

Figure 10:
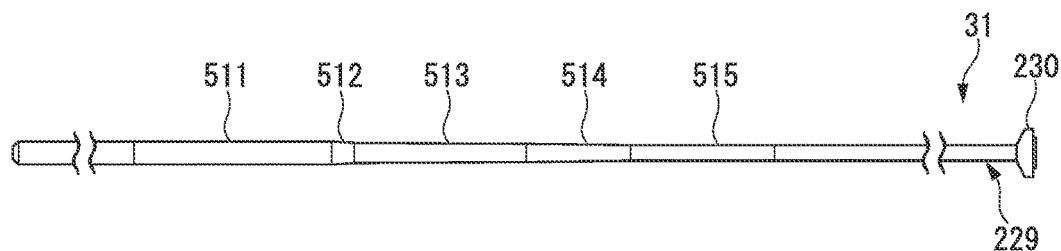
FIG. 10 is a lateral view showing a metering pin of the shock absorber according to the second embodiment of the present invention.

As shown in FIG. 10, the metering pin 31 of the second embodiment has a large diameter shaft section 511, a first tapered shaft section 512, a second tapered shaft section 513, a third tapered shaft section 514, and a small diameter shaft section 515. The large diameter shaft section 511 is positioned on the opposite side of the the support flange section 230 of the main body shaft section 229. The first tapered shaft section 512 is formed on the support flange section 230 side of the large diameter shaft section 511. The second tapered shaft section 513 is formed on the opposite side of the large diameter shaft section 511 of the first tapered shaft section 512. The third tapered shaft section 514 is formed on the opposite side of the first tapered shaft section 512 in the second tapered shaft section 513. The small diameter shaft section 515 is formed on the opposite side of the second tapered shaft section 513 of the third tapered shaft section 514.

Figure 11:
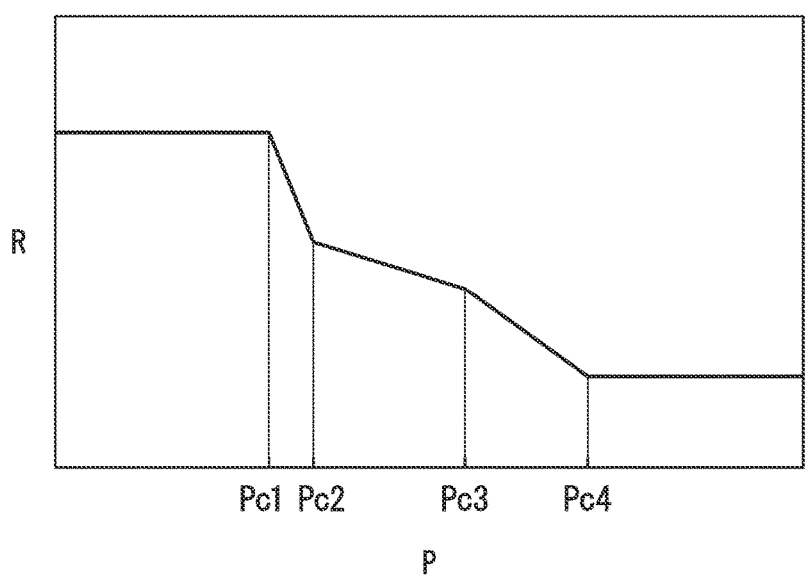
FIG. 11 is a graph showing an outer diameter R of the metering pin of the shock absorber according to the second embodiment of the present invention in an enlarged manner.

FIG. 11 is graph magnifying and showing the diameter R of each section (axial direction position P) of the metering pin 31. The left end section of the axial direction to an axial direction position Pc1 represents the large diameter shaft section 511, and the large diameter shaft section 511 has a constant diameter. The section from the axial direction position Pc1 to an axial direction position Pc2 represents the first tapered shaft section 512. The first tapered shaft section 512 is formed to have such a tapered shape that a first end section is connected to the large diameter shaft section 511 and the diameter is smaller at a position closer to a second end side. The section from the axial direction position Pc2 to an axial direction position Pc3 represents the second tapered shaft section 513. The second tapered shaft section 513 is formed to have such a tapered shape that a first end section is connected to the first tapered shaft section 512 and the diameter is smaller at a position closer to a second end side. The section from the axial direction position Pc3 to an axial direction position Pc4 represents the third tapered shaft section 514. The third tapered shaft section 514 is formed to have such a tapered shape that a first end section is connected to the second tapered shaft section 513 and the diameter is smaller at a position closer to a second end side. The axial direction position Pc4 to the right-side end section of FIG. 11 represents the small diameter shaft section 515. The small diameter shaft section 515 has a constant diameter and has one end section that connects to the third tapered shaft section 514. Accordingly, the small diameter shaft section 515 has a smaller diameter than the large diameter shaft section 511. A taper value is a value obtained by dividing the difference between the large diameter section and the small diameter section by the axial direction length. The taper value of the third tapered shaft section 514 is smaller than the taper value of the first tapered shaft section 512. The taper value of the second tapered shaft section 513 is smaller than the taper value of the third tapered shaft section 514. In other words, with respect to the taper values from the first tapered shaft section 512 to the third tapered shaft section 514, the taper value of the first tapered shaft section 512 is the maximum value, the taper value of the second tapered shaft section 513 is the minimum value, and the taper value of the third tapered shaft section 514 has an intermediate value between the maximum value and the minimum value.

The variable orifice 503 is formed by the metering pin 31 fixed to the cylinder 10 and the annular protruding section 502 of the piston rod 18. As the main body shaft section 229 of the metering pin 31 has the above-described shape, the passage area of the variable orifice 503 is variable according to the displacement with respect to the cylinder 10 of the piston rod 18. That is, the passage area of the variable orifice 503 varies according to the position of the piston rod 18.

Specifically, the passage area of the variable orifice 503 becomes maximally decreased to substantially restrict circulation of the liquid oil when the large diameter shaft section 511 of the metering pin 31 matches a position in the axial direction with the annular protruding section 502. In addition, the passage area of the variable orifice 503 becomes maximally increased to allow the circulation of the liquid oil when the small diameter shaft section 515 of the metering pin 31 matches a position in the axial direction with the annular protruding section 502. In addition, the variable orifice 503 allows the circulation of the liquid oil when the first tapered shaft section 512, the second tapered shaft section 513, and the third tapered shaft section 514 of the metering pin 31 match a position in the axial direction with the annular protruding section 502. Further, the variable orifice 503 is configured such that the passage area increases as the annular protruding section 502 is positioned closer to the small diameter shaft section 515. The magnification ratio of the passage area of the variable orifice 503 with respect to the movement amount in the axial direction to the compression side of the annular protruding section 502 is maximized when the annular protruding section 502 moves on the the first tapered shaft section 512. The maginification ratio of the passage area is minimized when the annular protruding section 502 moves on the second tapered shaft section 513. The maginification ratio of the passage area when the annular protruding section 502 moves on the the third tapered shaft section 514 is smaller than a maginification ratio when the annular protruding section 502 moves on the the first tapered shaft section 512 and is larger than a maginification ratio when the annular protruding section 502 moves on the the second tapered shaft section 513.

The relation of the passage area of the variable orifice 503 with respect to a stroke position of the piston rod 18 on the basis of the cylinder 10 is varied by the passage area adjustment mechanism 505. When the piston rod 18 is on the extension side of a maximum length-side predetermined position Sc1 of the extension-side, the annular protruding section 502 matches a position in the axial direction with the large diameter shaft section 511, and the passage area of the variable orifice 503 becomes substantially a minimum constant value. Further, from the maximum length-side predetermined position Sc1 to a first intermediate predetermined position Sc2 of the compression-side, the annular protruding section 502 matches a position in the axial direction with the first tapered shaft section 512. Thereby, the passage area of the variable orifice 503 is proportionally increased toward the compression-side. At this time, the passage area of the variable orifice 503 is magnified at a maximum magnification ratio. Further, from the first intermediate predetermined position Sc2 to a second intermediate predetermined position Sc3 of the compression-side, the annular protruding section 502 matches a position in the axial direction with the second tapered shaft section 513. Thereby, the passage area of the variable orifice 503 is proportionally increased toward the compression-side. At this time, the passage area of the variable orifice 503 magnifies at a minimum magnification ratio. Further, from the second intermediate predetermined position Sc3 to a minimum length-side predetermined position Sc4 of the compression-side, the annular protruding section 502 matches a position in the axial direction with the third tapered shaft section 514. Thereby, the passage area of the variable orifice 503 is proportionally increased toward the extension-side. At this time, the passage area of the variable orifice 503 magnifies at an intermediate magnification ratio between the maximum magnification ratio and the minimum magnification ratio. Further, on the compression side of a minimum length-side predetermined position Sc4, the annular protruding section 502 matches a position in the axial direction with the small diameter shaft section 515. Thereby, the passage area of the variable orifice 503 is maximized and substantially constant.

Figure 12:
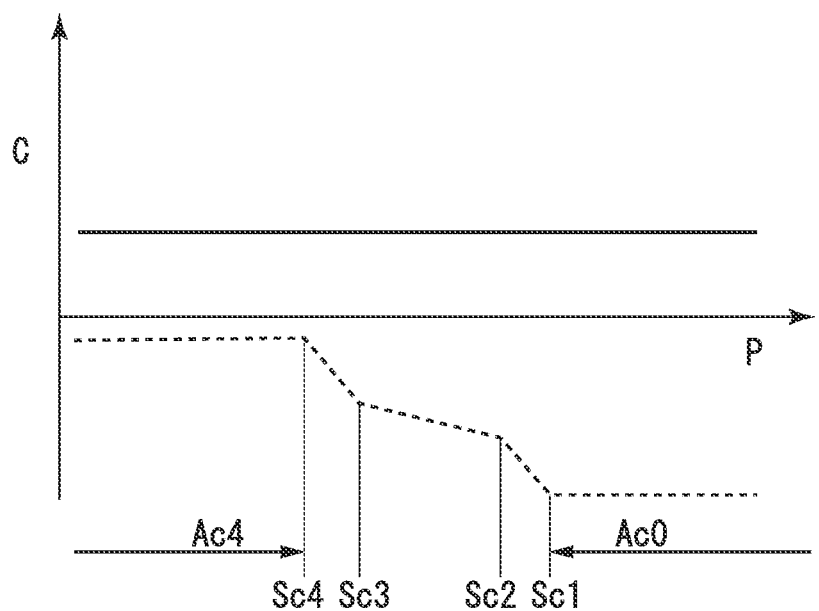
FIG. 12 is a graph showing a relationship between a stroke position P and a damping coefficient C of the piston rod of the shock absorber according to the second embodiment of the present invention.

In the shock absorber 1 according to the second embodiment, in a maximum length-side predetermined range Ac0, the piston rod 18 extends to the outside of the cylinder 10 and further than the maximum length-side predetermined position Sc1 shown in FIG. 12 with respect to the cylinder 10. In the maximum length-side predetermined range Ac0, the passage area adjustment mechanism 505 matches the annular protruding section 502 at a position in the axial direction of the large diameter shaft section 511 of the metering pin 31 to substantially close the variable orifice 503.

In the maximum length-side predetermined range Ac0, at the compression stroke in which the piston rod 18 is pushed into the inside of the cylinder 10, the piston 15 moves toward the lower chamber 17, the pressure of the lower chamber 17 is increased, and the pressure of the upper chamber 16 is decreased. Then, the hydraulic pressure of the lower chamber 17 is applied to the damping valve main body 182 of the damping valve 207 of the damping force generating mechanism 115 of the compression-side via the communication passage 112 of the compression-side formed in the piston 15. At this time, the passage area adjustment mechanism 505 matches the annular protruding section 502 at a position in the axial direction of the large diameter shaft section 511 of the metering pin 31 to substantially close the variable orifice 503. The pilot chamber 200 applies a pilot pressure to the damping valve main body 182 in a direction of the seat section 118. Since the pilot chamber 200 comes into communication with the lower chamber 17 via the rod-inside communication passage 32, the pilot pressure becomes similar to a pressure of the lower chamber 17, and the pilot pressure also increases with an increase in pressure of the lower chamber 17.

In this state, when the piston speed is low, the increase in pressure of the pilot chamber 200 can follow the increase in pressure of the lower chamber 17. Therefore, the damping valve main body 182 is reduced in the received pressure difference and cannot be easily separated from the seat section 118. Accordingly, the liquid oil from the lower chamber 17 flows to the upper chamber 16 from the rod-inside communication passage 32 and the pilot chamber introduction passage 201 through the pilot chamber 200 via the orifice 214 of the plurality of disks 185 of the disc valve 213. At this time, a damping force of orifice properties in which the damping force is substantially in proportion to a square of the piston speed is generated. For this reason, in properties of the damping force with respect to the piston speed, the rate of increase of the damping force is increased relative to an increase in piston speed.

In addition, even when the piston speed is increased more than the above, the damping valve main body 182 cannot be easily separated from the seat section 118. At this time, the liquid oil from the lower chamber 17 flows to the upper chamber 16 from the rod-inside communication passage 32, and the pilot chamber introduction passage 201 through the pilot chamber 200 and flows through a space between the seat section 197 and the plurality of disks 185 while opening the plurality of disks 185 of the disc valve 213. As a result, a damping force of valve characteristics in which the damping force is substantially proportional to the piston speed is generated. For this reason, in the properties of the damping force with respect to the piston speed, a rate of increase of the damping force is slightly decreased with respect to the increase in piston speed. As described above, in the maximum length-side predetermined range Ac0, the compression-side damping coefficient of the compression stroke becomes a hard state in which the extension-side damping coefficient is substantially constant.

As described above, the maximum length-side predetermined range Ac0 in which the piston rod 18 extends to the outside of the cylinder 10 further than the maximum length-side predetermined position Sc1 has maximum length-side properties in which the compression-side damping coefficient signifies the compression-side hard state where the compression-side damping coefficient is hard as shown in FIG. 12.

In the minimum length-side predetermined range Ac4, the piston rod 18 is pressed into the inside of the cylinder 10 further than the minimum length-side predetermined position Sc4 with respect to the cylinder 10. In the minimum length-side predetermined range Ac4, the passage area adjustment mechanism 505 matches the position of the annular protruding section 502 at a position in the axial direction of the small diameter shaft section 515 of the metering pin 31 to maximize the passage area of the variable orifice 503. In the minimum length-side predetermined range Ac4, the rod-inside communication passage 32 comes into communication with the upper chamber 16 via the variable orifice 503, and the pilot chamber 140 of the damping force generating mechanism 114 of the extension-side and the pilot chamber 200 of the damping force generating mechanism 115 of the compression-side come into communication with the upper chamber 16 and the lower chamber 17 via the variable orifice 503, the rod-inside communication passage 32, and the pilot chamber introduction passages 141 and 201.

At the compression stroke, the piston rod 18 is pushed into the inside of the cylinder 10 in the minimum length-side predetermined range Ac4. At the compression stroke, the piston 15 moves toward the lower chamber 17, the pressure of the lower chamber 17 is increased, and the pressure of the upper chamber 16 is decreased. Then, the pressure of the lower chamber 17 is applied to the damping valve main body 182 of the damping valve 207 of the damping force generating mechanism 115 of the compression-side via the communication passage 112 of the compression-side formed in the piston 15. The pilot chamber 200 applies the pilot pressure in the direction of the seat section 118 to the damping valve main body 182. At this time, the pilot chamber 200 comes into communication with the upper chamber 16 via the variable orifice 503, the rod-inside communication passage 32, and the pilot chamber introduction passage 201. Therefore, the pressure state of the pilot chamber 200 becomes similar to that of the upper chamber 16, and the pilot pressure is decreased. Accordingly, the damping valve main body 182 has a received pressure difference, which is increased, is opened to be relatively easily separated from the seat section 118, and allows the liquid oil to flow toward the upper chamber 16 side via the passage 208 in the radial direction between the piston 15 and the seat member 184. Further, the rod-inside communication passage 32 allows the liquid oil of the lower chamber 17 to flow into the upper chamber 16 via the communication passage 99. Accordingly, the damping force is decreased. As described above, in the minimum length-side predetermined range Ac4, the compression-side damping coefficient of the compression stroke signifies a soft state in which the compression-side damping coefficient is substantially constant as shown in FIG. 12.

In the minimum length-side predetermined range Ac4, the piston rod 18 is pressed into the inside of the cylinder 10 further than the minimum length-side predetermined position Sc4. The minimum length-side predetermined range Ac4 has minimum length-side properties in which the compression-side damping coefficient signifies the compression-side soft state where the compression-side damping coefficient is soft as shown in FIG. 12.

When the piston rod 18 is in the intermediate predetermined ranges Sc1 to Sc4 between the maximum length-side predetermined position Sc1 and the minimum length-side predetermined position Sc4 with respect to the cylinder 10, the shock absorber 1 has properties in which the compression-side damping coefficient signifies a state of varying between the compression-side hard state and the compression-side soft state.

In the intermediate predetermined ranges Sc1 to Sc4, the passage area adjustment mechanism 505 matches the position in the axial direction of any of the first tapered shaft section 512, the second tapered shaft section 513, and the third tapered shaft section 514 of the metering pin 31 with the position in the axial direction of the annular protruding section 502 and opens the variable orifice 503. Further, the piston rod 18 widely opens the variable orifice 503 as the piston rod 18 is positioned closer to the minimum length-side predetermined position Sc4 and farther from the maximum length-side predetermined position Sc1. In the intermediate predetermined ranges Sc1 to Sc4, the rod-inside communication passage 32 comes into communication with the upper chamber 16 via the communication passage 99 and comes into communication with the lower chamber 17. The pilot chamber 200 of the damping force generating mechanism 115 of the compression-side comes into communication with the upper chamber 16 and the lower chamber 17. Further, the communication amount to the upper chamber 16 decreases as the piston rod 18 is closer to the maximum length-side predetermined position Sc1, and the communication amount to the upper chamber 16 increases as the piston rod 18 is closer to the the minimum length-side predetermined position Sc4.

At the compression stroke in which the piston rod 18 is in the intermediate predetermined ranges Sc1 to Sc4 and is pressed into the inside of the cylinder 10, the piston 15 moves toward the lower chamber 17, the pressure of the lower chamber 17 is increased, and the pressure of the upper chamber 16 is decreased. Then, the pressure of the lower chamber 17 is applied to the damping valve main body 182 of the damping valve 207 of the damping force generating mechanism 115 of the compression-side via the communication passage 112 of the compression-side formed at the piston 15. The pilot chamber 200 applies the pilot pressure in the direction of the seat section 118 to the damping valve main body 182. The pilot chamber 200 comes into communication with the upper chamber 16 via the communication passage 99, the rod-inside communication passage 32 including the variable orifice 503, and the pilot chamber introduction passage 201 and comes into communication with the lower chamber 17 via the rod-inside communication passage 32. Therefore, the pressure of the pilot chamber 140 becomes smaller than the pressure when the piston rod 18 is in the maximum length-side predetermined range Ac0, and the pilot pressure is decreased. Accordingly, the damping valve main body 182 is increased in the received pressure difference compared to a case where the piston rod 18 is in the maximum length-side predetermined range Ac0, is easily separated from the seat section 118, and allows the liquid oil to flow toward the upper chamber 16 via the passage 208 in the radial direction between the piston 15 and the seat member 184. Accordingly, the damping force is decreased. Additionally, the liquid oil flows from the lower chamber 17 to the upper chamber 16 via the communication passage 99 and the rod-inside communication passage 32 including the variable orifice 503. Thereby, the damping force is also decreased.

When the piston rod 18 is in the intermediate predetermined ranges Sc1 to Sc4, the damping force is decreased as the passage area of the variable orifice 503 is increased. As described above, the taper value of the metering pin 31 that determines the passage area of the variable orifice 503 is maximized at the first tapered shaft section 512, is minimized at the second tapered shaft section 513, and is an intermediate value between the maximum value and the minimum value at the third tapered shaft section 514. Therefore, the magnification ratio of the passage area of the variable orifice 503 with respect to the movement amount in the axial direction to the compression side of the annular protruding section 502 installed at the piston rod 18 is maximized when the annular protruding section 502 moves on the first tapered shaft section 512, that is, when the piston rod 18 moves from the maximum length-side predetermined position Sc1 to the first intermediate predetermined position Sc2. The magnification ratio is minimized when the annular protruding section 502 moves on the second tapered shaft section 513, that is, when the piston rod 18 moves from the first intermediate predetermined position Sc2 to the second intermediate predetermined position Sc3. The magnification ratio is an intermediate value between the maximum value and the minimum value when the annular protruding section 502 moves on the the third tapered shaft section 514, that is, when the piston rod 18 moves from the second intermediate predetermined position Sc3 to the minimum length-side predetermined position Sc4.

As a result, extension-side damping force properties when the piston rod 18 is in the intermediate predetermined ranges Sc1 to Sc4 include a part in which the damping coefficient change rate with respect to the stroke of the piston rod 18 is large and a part in which the damping coefficient change rate is small. Specifically, a damping coefficient change rate $\alpha$ c2 when the piston rod 18 is in the second intermediate predetermined range Sc2 to Sc3 from the first intermediate predetermined position Sc2 to the second intermediate predetermined position Sc3 is smaller than a damping coefficient change rate $\alpha$ c1 when the piston rod 18 is in the first intermediate predetermined range Sc1 to Sc2 from the maximum length-side predetermined position Sc1 to the first intermediate predetermined position Sc2. A damping coefficient change rate $\alpha$ c3 when the piston rod 18 is in the third intermediate predetermined range Sc3 to Sc4 from the second intermediate predetermined position Sc3 to the minimum length-side predetermined position Sc4 is smaller than the damping coefficient change rate $\alpha$ c1 and is larger than the damping coefficient change rate $\alpha$ c2. The stroke range Sc2 to Sc3 of the small damping coefficient change rate $\alpha$ c2 is wider than a range obtained by combining the stroke range Sc1 to Sc2 of the large damping coefficient change rate $\alpha$ c1 with the stroke range Sc3 to Sc4 of the damping coefficient change rate $\alpha$ c3. Additionally, the damping coefficient C in the small damping coefficient change rate $\alpha$ c2 is determined such that a proportion C/Cc of the damping coefficient C to a critical damping coefficient Cc becomes constant with respect to the change in a mass added to the piston rod 18 or the cylinder 10.

The shock absorber 1 according to the second embodiment can obtain the above-mentioned position-sensitive damping force variation properties. The 1G position is set in the second intermediate predetermined range Sc2 to Sc3 having a small damping coefficient change rate $\alpha$ c2, and thereby the damping coefficient change rate at the 1G position can be the small damping coefficient change rate $\alpha$ c2. In the second embodiment, the extension-side damping force properties have substantially constant medium properties between hard and soft as shown by a solid line in FIG. 12.

In the second embodiment, the shock absorber 1 has compression-side damping force properties in which the compression-side damping coefficient signifies a state of varying between the compression-side hard state and the compression-side soft state when the piston rod 18 is between the maximum length-side predetermined position Sc1 and the minimum length-side predetermined position Sc4. The compression-side damping force properties include a part in which the damping coefficient change rate with respect to the stroke of the piston rod 18 is large and a part in which the damping coefficient change rate is small. The first intermediate predetermined range Sc1 to Sc2 at an initial stage when the piston rod 18 strokes to the compression side from the maximum length-side predetermined position Sc1 has a large damping coefficient change rate $\alpha$ c1. Therefore, a damping coefficient change rate $\alpha$ c2 which is smaller than the damping coefficient change rate $\alpha$ c1 can be set in the second intermediate predetermined range Sc2 to Sc3 from the first intermediate predetermined position Sc2 to the second intermediate predetermined position Sc3, which comes after the first intermediate predetermined range Sc1 to Sc2. Then, by setting the 1G position in the second intermediate predetermined range Sc2 to Sc3 having the damping coefficient change rate $\alpha$ c2, the damping coefficient change rate at the 1G position can be a small damping coefficient change rate $\alpha$ c2. Accordingly, even when the number of passengers and the load weight are varied, it is possible to limit changes in properties of the ride comfort of the shock-absorber-mounted vehicle V and steering stability.

Third Embodiment

Next, the third embodiment is described focusing on different parts from the first embodiment mainly based on FIGS. 13 to 18. Parts common to the first embodiment are provided with the same names and the same reference numerals.

Figure 13:
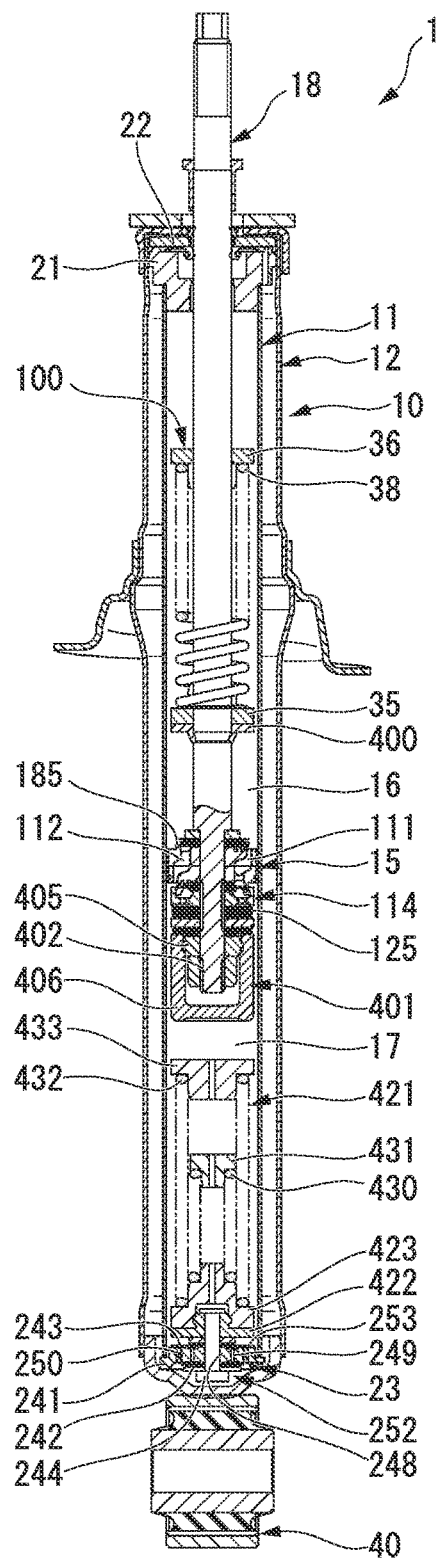
FIG. 13 is a cross-sectional view showing a shock absorber according to a third embodiment of the present invention.
Figure 14:
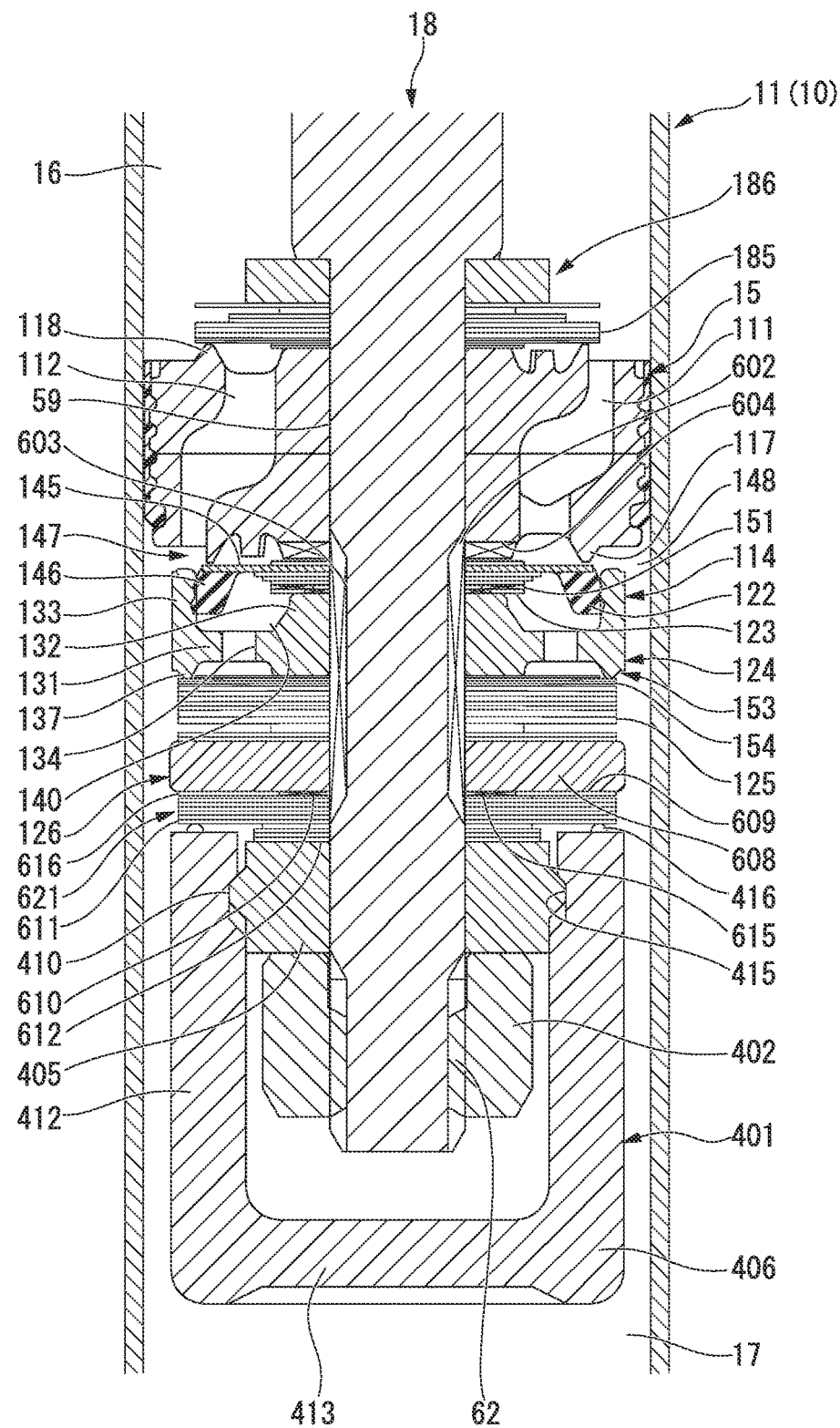
FIG. 14 is a cross-sectional view showing a major part of the shock absorber according to the third embodiment of the present invention.
Figure 15:
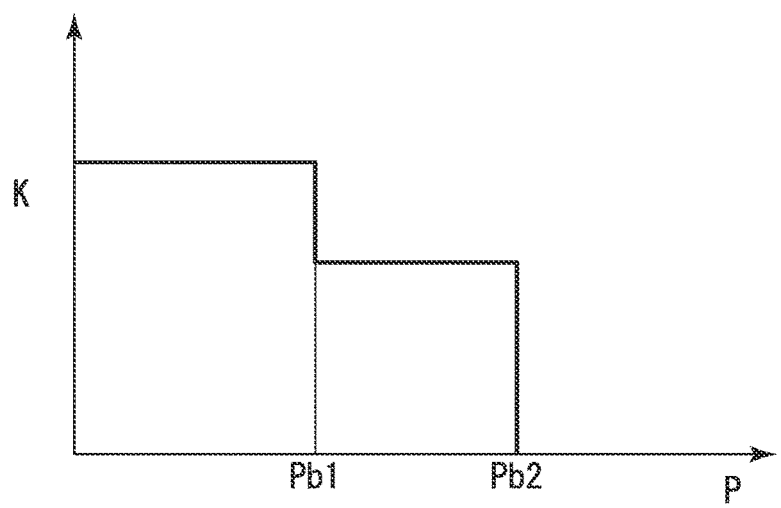
FIG. 15 is a graph showing a relationship between an axial direction position P and a spring constant K of a spring mechanism of the shock absorber according to the third embodiment of the present invention.

In the third embodiment shown in FIG. 13, the seat member 124, the disks 121, 123, 125, and the damping valve main body 122 similar to the first embodiment shown in FIG. 2 are installed between the piston 15 and a transmission mechanism 401 as shown in FIG. 14. That is, the third embodiment has the damping force generating mechanism 114 similar to the first embodiment. Further, as shown in FIG. 14, a plurality of passage grooves 603 that configure a rod-inside passage 602 are formed along the axis direction on the outer circumferential section of the attachment shaft section 59 of the piston rod 18 at intervals in the circumferential direction. A passage groove 604 that comes into communication with the upper chamber 16 via the communication passage 111 is formed on the seat section 117 side of the piston 15. The passage groove 604 and the orifice 151 of the disk 123 come into communication with the passage groove 603.

On the attachment shaft section 59 of the piston rod 18, the valve restriction member 126, a disk 609, an intermediate disk 610, a plurality of disks 611, an intervention section 612, a base member 405 of the transmission mechanism 401, and a nut 402 are installed in this order from the opposite side of the piston 15 of the disk 125. The intervention section 612 is configured by a plurality of annular members. A support member 608 on the disk 609 side of the valve restriction member 126 has a larger diameter than that of the disk 609. A passage 615 is formed in the disk 609 and the intermediate disk 610. The passage 615 comes into communication with a variable orifice 616 in a gap between the disk 609 formed by the intermediate disk 610 and the disk 611. The passage 615 comes into communication with the rod-inside passage 602 of the piston rod 18. Accordingly, the variable orifice 616 brings the rod-inside passage 602 into communication with the lower chamber 17.

Figure 16:
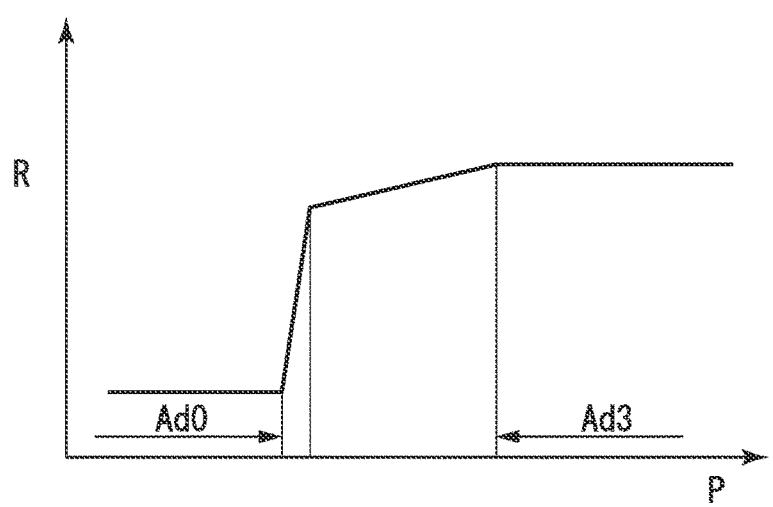
FIG. 16 is a graph showing a passage area R of a variable orifice in the axial direction position P of the shock absorber according to the third embodiment of the present invention.
Figure 17:
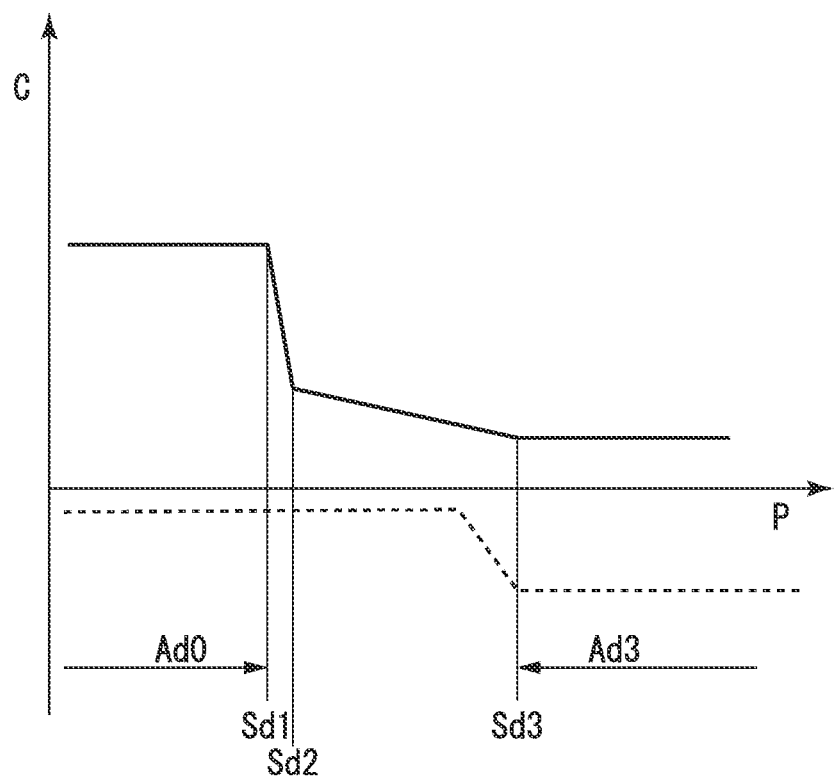
FIG. 17 is a graph showing a relationship between a stroke position P and a damping coefficient C of the piston rod of the shock absorber according to the third embodiment of the present invention.

A press protrusion 416 of a transmission member 406 of the transmission mechanism 401 abuts a disk 611 on the opposite side of the disk 609 of the plurality of disks 611. A spring mechanism 421 shown in FIG. 13, the transmission member 406, and the disk 611 and the disk 609 configured to open and close the variable orifice 616 shown in FIG. 14 configure a passage area adjustment mechanism 621. The passage area adjustment mechanism 621 adjusts the passage area of the variable orifice 616 according to the biasing force of the spring mechanism 421 varied by the position of the piston rod 18. The spring constant of the spring mechanism 421 has properties shown in FIG. 15. The passage area R of the variable orifice 616 controlled by the spring mechanism 421 is set as shown in FIG. 16.

Figure 18:
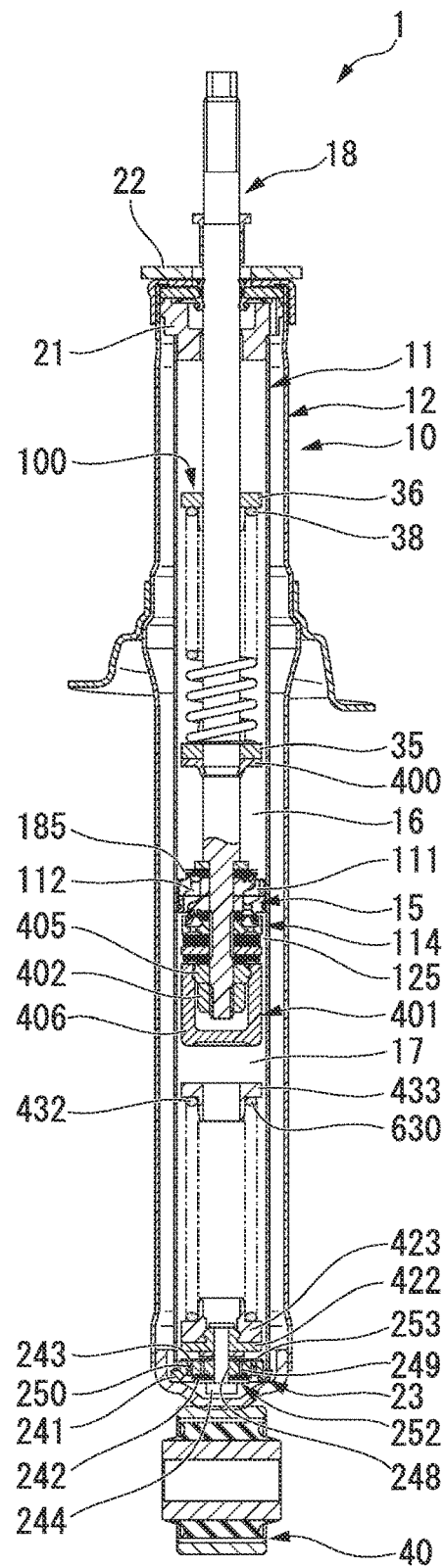
FIG. 18 is a cross-sectional view showing a modified example of a shock absorber according to the third embodiment of the present invention.

In a minimum length-side predetermined range Ad0, the piston rod 18 shown in FIG. 18 is pressed into the inside of the cylinder 10 further than a minimum length-side predetermined position Sd1. In a minimum length-side predetermined range Ad0, a small diameter coil spring 430 and a large diameter coil spring 432 of the spring mechanism 421 abut the transmission mechanism 401, and the small diameter coil spring 430 and the large diameter coil spring 432 are decreased in length. Accordingly, the passage area adjustment mechanism 621 presses the plurality of disks 611 by the press protrusion 416 of the transmission mechanism 401 and brings the plurality of disks 611 in contact with the disk 609 to close the variable orifice 616 as shown in FIG. 16. In the minimum length-side predetermined range Ad0, the rod-inside passage 602 comes into communication only with the upper chamber 16 via the passage groove 604 and the communication passage 111, and the pilot chamber 140 of the damping force generating mechanism 114 comes into communication only with the upper chamber 16.

In the extension stroke, the piston rod 18 is drawn toward the outside of the cylinder 10 in the minimum length-side predetermined range Ad0. In the extension stroke, the piston 15 moves toward the upper chamber 16, the pressure of the upper chamber 16 is increased, and the pressure of the lower chamber 17 is decreased. Then, the pressure of the upper chamber 16 is applied to the damping valve main body 122 of the damping valve 147 of the damping force generating mechanism 114 of the extension-side via the communication passage 111 of the extension-side formed in the piston 15. Here, the pilot chamber 140 configured to apply a pilot pressure to the damping valve main body 122 in a direction of the seat section 117 comes into communication with the upper chamber 16 via the orifice 151, the rod-inside passage 602, the passage groove 604, and the communication passage 111. Therefore, the pilot pressure becomes similar to the pressure of the upper chamber 16, and the pilot pressure is also increased with an increase in pressure of the upper chamber 16. In this state, the damping valve main body 122 is reduced in the received pressure difference and cannot be easily separated from the seat section 117. Thereby, the damping force of the extension stroke is increased and an extension-side hard state is obtained in which the extension-side damping coefficient is substantially constant and is hard.

In a maximum length-side predetermined range Ad3, the piston rod 18 extends to the outside of the cylinder 10 further than a maximum length-side predetermined position Sd3. In the maximum length-side predetermined range Ad3, the transmission mechanism 401 is separated from the spring mechanism 421, and the variable orifice 616 is opened as shown in FIG. 16. The rod-inside passage 602 comes into communication with the lower chamber 17 via the variable orifice 616. Therefore, the pilot chamber 140 of the damping force generating mechanism 114 of the extension-side comes in common communication with the lower chamber 17 via the variable orifice 616, the rod-inside passage 602, and the orifice 151. Further, the communication passage 111 comes into communication with the lower chamber 17 via the variable orifice 616, the rod-inside passage 602, and the passage groove 604.

In the extension stroke, the piston rod 18 is drawn toward the outside of the cylinder 10 in the maximum length-side predetermined range Ad3. In the extension stroke, the piston 15 moves toward the upper chamber 16, the pressure of the upper chamber 16 is increased, and the pressure of the lower chamber 17 is decreased. Then, the pressure of the upper chamber 16 is applied to the damping valve main body 122 of the damping valve 147 of the damping force generating mechanism 114 of the extension-side via the communication passage 111 of the extension-side formed in the piston 15. The pilot chamber 140 applies pilot pressure to the damping valve main body 122 in a direction of the seat section 117. At this time, since the pilot chamber 140 comes into communication with the lower chamber 17 via the orifice 151, the rod-inside passage 602, and the variable orifice 616, the pilot pressure is decreased. Accordingly, the damping valve main body 122 is increased in the received pressure difference, is opened to be relatively easily separated from the seat section 117, and allows the liquid oil to flow toward the lower chamber 17 via the passage 148 in the radial direction between the piston 15 and the seat member 124. Accordingly, the damping force is decreased. Further, since the passage groove 604, the rod-inside passage 602, and the variable orifice 616 brings the upper chamber 16 into communication with the lower chamber 17, the liquid oil is allowed to flow. Thereby, the damping force is decreased. Accordingly, the extension-side damping force becomes an extension-side soft state in which the extension-side damping coefficient is substantially constant and is soft.

When the piston rod 18 is in the intermediate predetermined ranges Sd1 to Sd3 between the minimum length-side predetermined position Sd1 and the maximum length-side predetermined position Sd3 with respect to the cylinder 10, the shock absorber 1 has properties in which the compression-side damping coefficient signifies a state of varying between the extension-side hard state and the extension-side soft state.

In the first intermediate predetermined range Sd1 to Sd2 between the minimum length-side predetermined position Sd1 and the intermediate predetermined position Sd2 of the intermediate predetermined ranges Sd1 to Sd3, the transmission mechanism 401 attached to the piston rod 18 becomes a state of receiving no biasing force by the small diameter coil spring 430 from a state in which the large diameter coil spring 432 and the small diameter coil spring 430 of the spring mechanism 421, that is, two springs, are decreased in length at the minimum length-side predetermined position Sd1. The disk 611 of the variable orifice 616 is opened against the biasing force. Therefore, the damping coefficient is drastically decreased to the intermediate predetermined position Sd2. That is, in the first intermediate predetermined range Sd1 to Sd2, the damping coefficient change rate becomes a large damping coefficient change rate $\alpha$ d1.

In the second intermediate predetermined range Sd2 to Sd3 between the intermediate predetermined position Sd2 and the maximum length-side predetermined position Sd3 of the intermediate predetermined ranges Sd1 to Sd3, the transmission mechanism 401 attached to the piston rod 18 is in a state in which only the large diameter coil spring 432 is decreased in length. The transmission mechanism 401 opens the disk 611 of the variable orifice 616 against the biasing force having intensity according to the compression amount of only the large diameter coil spring 432 by the pressure of the upper chamber 16. Thereby, the damping coefficient change rate becomes a damping coefficient change rate $\alpha$ d2 which is smaller than a damping coefficient change rate $\alpha$ d1. Accordingly, the extension-side damping force properties of the intermediate predetermined ranges Sd1 to Sd3 include a part in which the damping coefficient change rate with respect to the stroke of the piston rod 18 is large and a part in which the damping coefficient change rate is small, and the first intermediate predetermined range Sd1 to Sd2 at an initial stage when the piston rod 18 strokes to the extension side from the minimum length-side predetermined position Sd1 has a large damping coefficient change rate.

The shock absorber 1 according to the third embodiment can obtain the above-mentioned position-sensitive damping force variation properties. The 1G position is set in the second intermediate predetermined range Sd2 to Sd3 having a small damping coefficient change rate $\alpha$ d2, and thereby the damping coefficient change rate at the 1G position can be the small damping coefficient change rate $\alpha$ d2.

The shock absorber 1 according to the third embodiment has extension-side damping force properties in which the extension-side damping coefficient signifies a state of varying between the extension-side hard state and the extension-side soft state when the piston rod 18 is in the intermediate predetermined ranges Sd1 to Sd3 between the minimum length-side predetermined position Sd1 and the maximum length-side predetermined position Sd3. The extension-side damping force properties include a part in which the damping coefficient change rate with respect to the stroke of the piston rod 18 is large and a part in which the damping coefficient change rate is small and have a large damping coefficient change rate $\alpha$ d1 at an initial stage when the piston rod 18 strokes to the extension side from the minimum length-side predetermined position Sd1, that is, in the first intermediate predetermined range Sd1 to Sd2 from the minimum length-side predetermined position Sd1 to the intermediate predetermined position Sd2. Therefore, a damping coefficient change rate $\alpha$ d2 which is smaller than the damping coefficient change rate $\alpha$ d1 can be set in the second intermediate predetermined range Sd2 to Sd3 from the intermediate predetermined position Sd2 to the maximum length-side predetermined position Sd3, which follows the first intermediate predetermined range Sd1 to Sd2. Then, by setting the 1G position in the second intermediate predetermined range Sd2 to Sd3 having the damping coefficient change rate $\alpha$ d2, the damping coefficient change rate at the 1G position can be a small damping coefficient change rate $\alpha$ d2. Accordingly, even when the number of passengers and the load weight are varied, it is possible to limit changes in properties of the ride comfort of the shock-absorber-mounted vehicle V and steering stability.

In the third embodiment, the spring mechanism 421 can obtain the above-described non-linear properties using two springs of the small diameter coil spring 430 and the large diameter coil spring 432. However, as shown in FIG. 18, a non-linear coil spring 630 may be used which can provide non-linear properties using one spring.

According to the embodiments described above, the shock absorber includes a cylinder in which a working fluid is sealed, a piston slidably fitted into the cylinder and configured to divide the inside of the cylinder into two chambers, a piston rod connected to the piston and extending toward the outside of the cylinder, a communication passage configured to cause the two chambers to communicate with and configured to allow the working fluid to flow between the two chambers according to movement of the piston, and a damping force generating device installed at the communication passage and configured to limit a flow of the working fluid generated by movement of the piston to generate a damping force, wherein: the damping force generating device includes a minimum length-side property in which an extension-side damping coefficient signifies a hard state in a range where the piston rod enters further inside the cylinder than a minimum length-side predetermined position, a maximum length-side property in which the extension-side damping coefficient signifies a soft state in a range where the piston rod extends further outside the cylinder than a maximum length-side predetermined position, and a property in which the extension-side damping coefficient signifies a state of varying between the hard state and the soft state when the piston rod is between the minimum length-side predetermined position and the maximum length-side predetermined position; an extension-side damping force property between the minimum length-side predetermined position and the maximum length-side predetermined position includes a part in which a damping coefficient change rate with respect to a stroke of the piston rod is large and a part in which the damping coefficient change rate is small; and at least when the piston rod strokes to the extension side from the minimum length-side predetermined position, the damping coefficient change rate is allowed to be large. In this way, the extension-side damping force properties include a part in which the damping coefficient change rate with respect to the stroke of the piston rod is large and a part in which the damping coefficient change rate is small and have a large damping coefficient change rate at an initial stage when the piston rod strokes to the extension side from the minimum length-side predetermined position. Therefore, a damping coefficient change rate which is smaller than the above-described damping coefficient change rate can be set after the initial stage. Then, by setting the 1G position in the range having the small damping coefficient change rate, the damping coefficient change rate at the 1G position can be a small damping coefficient change rate. Accordingly, even when the number of passengers and the load weight are varied, it is possible to limit changes in properties of the ride comfort of the shock-absorber-mounted vehicle and steering stability. Accordingly, it is possible to further improve damping force properties.

Further, the range of the part in which the damping coefficient change rate is small in the extension-side damping force property is wider than the range of the part in which the damping coefficient change rate is large. Therefore, even when changes in the number of passengers and the load weight are relatively large, it is possible to limit changes in properties of the ride comfort of the shock-absorber-mounted vehicle and steering stability.

Further, the damping coefficient in the part in which the damping coefficient change rate is small is determined such that the proportion of the damping coefficient to the critical damping coefficient becomes constant with respect to the change in mass added to the piston rod or the cylinder. Therefore, it is possible to further limit changes in properties of the ride comfort of the shock-absorber-mounted vehicle V and steering stability against changes in the number of passengers and the load weight.

Further, a shock absorber includes a cylinder in which a working fluid is sealed, a piston slidably fitted into the cylinder and configured to divide the inside of the cylinder into two chambers, a piston rod connected to the piston and extending toward the outside of the cylinder, a communication passage configured to cause the two chambers to communicate and configured to allow the working fluid to flow between the two chambers according to movement of the piston, and a damping force generating device installed at the communication passage and configured to limit a flow of the working fluid generated by movement of the piston to generate a damping force, wherein: the damping force generating device includes a maximum length-side property in which a compression-side damping coefficient signifies a hard state in a range where the piston rod extends further outside the cylinder than a maximum length-side predetermined position, a minimum length-side property in which the compression-side damping coefficient signifies a soft state in a range which the piston rod enters further inside the cylinder than a minimum length-side predetermined position, and a property in which the compression-side damping coefficient signifies a state of varying between the soft state and the hard state when the piston rod is between the maximum length-side predetermined position and the minimum length-side predetermined position; a compression-side damping force property between the maximum length-side predetermined position and the minimum length-side predetermined position includes a part in which a damping coefficient change rate with respect to a stroke of the piston rod is large and a part in which the damping coefficient change rate is small; and at least when the piston rod strokes to the compression side from the maximum length-side predetermined position, the damping coefficient change rate is allowed to be large. In this way, the compression-side damping force properties include a part in which the damping coefficient change rate with respect to the stroke of the piston rod is large and a part in which the damping coefficient change rate is small and have a large damping coefficient change rate at an initial stage when the piston rod strokes to the compression side from the maximum length-side predetermined position. Therefore, a damping coefficient change rate which is smaller than the above-described damping coefficient change rate can be set after the initial stage. Then, by setting the 1G position in the range having the small damping coefficient change rate, the damping coefficient change rate at the 1G position can be a small damping coefficient change rate. Accordingly, even when the number of passengers and the load weight are varied, it is possible to limit changes in properties of the ride comfort of the shock-absorber-mounted vehicle and steering stability. Accordingly, it is possible to further improve the damping force properties.

Further, the damping force generating device includes a passage area adjustment mechanism configured to adjust the passage area of the communication passage according to the position of the piston rod. Therefore, the adjustment of the damping force properties according to the position of the piston rod can be made easily and in detail.

Further, the above-described shock absorber is used in only a rear wheel, of a front wheel and a rear wheel. Therefore, it is possible to effectively limit changes in properties of the ride comfort of the shock-absorber-mounted vehicle and steering stability.

The above embodiments of the present invention are described using an example of dual pipe type hydraulic pressure shock absorber; however, the application is not limited thereto. For example, the shock absorber according to the above embodiments may be used for a mono-tube type hydraulic pressure shock absorber having no outer cylinder and having a gas chamber formed in a slidable divided body of the lower chamber 17 in the cylinder 10 to the opposite side of the upper chamber 16 and can be used for any shock absorber. The present invention can be also applied to the above-described base valve 23. Further, the above embodiments are also applicable to a case where an oil passage configured to come into communication with the inside of the cylinder 10 is installed outside of the cylinder 10, and a damping force generating mechanism is installed on the oil passage. The above embodiments are described using an example of the hydraulic pressure shock absorber; however, water or air can be used as the fluid.

INDUSTRIAL APPLICABILITY

According to the shock absorber and the vehicle described above, it is possible to further improve the damping force properties.

REFERENCE SIGNS LIST 10 cylinder
15 piston
16 upper chamber
17 lower chamber 18 piston rod
31 metering pin
32 rod-inside communication passage
99, 111, 112 communication passage
237, 503, 616 variable orifice (communication passage)
101, 238, 505, 621 passage area adjustment mechanism (damping force generating device)
114, 115 damping force generating mechanism (damping force generating device)
421 spring mechanism (damping force generating device)
Sa1, Sb1, Sc4, Sd1 minimum length-side predetermined position
Sa4, Sb3, Sc1, Sd3 maximum length-side predetermined position
V vehicle
Wf front wheel
Wr rear wheel

The invention claimed is:

1. A shock absorber comprising:
a cylinder in which a working fluid is sealed;
a piston slidably fitted into the cylinder and configured to divide the inside of the cylinder into two chambers including a first chamber which is an upper side of the cylinder and a second chamber which is a lower side of the cylinder;
a piston rod connected to the piston and extending toward an outside of the cylinder;
a communication passage configured to cause the two chambers to communicate and configured to allow the working fluid to flow between the two chambers according to movement of the piston; and
a damping force generating device installed at the communication passage and configured to limit a flow of the working fluid generated by movement of the piston to generate a damping force,
wherein the damping force generating device includes:
an extension-side damping valve configured to generate a damping force mainly in an extension stroke,
a compression-side damping valve configured to generate a damping force mainly in a compression stroke,
an extension-side pilot chamber provided on the extension-side damping valve, the extension-side pilot chamber configured to apply an internal pressure to the extension-side damping valve in a direction closing the extension-side damping valve,
a mechanism configured to cause the extension-side pilot chamber to communicate with the first chamber in a range where the piston rod enters further inside the cylinder than a minimum length-side predetermined position, the mechanism further configured to cause a first passage area communicating between the extension-side pilot chamber and the second chamber to be smaller than a second passage area communicating between the extension-side pilot chamber and the first chamber,
wherein, when the piston rod strokes to an extension side and when the piston rod is at an intermediate predetermined position, the first passage area communicating between the extension-side pilot chamber and the second chamber is configured to have a first passage area varying rate with respect to the stroke of the piston rod and a second passage area varying rate with respect to the stroke of the piston rod that is smaller than the first passage area varying rate, and
wherein, at least when the piston rod strokes to the extension side from the minimum length-side predetermined position, the first passage area is predetermined to have the first passage area varying rate.

2. The shock absorber according to claim 1, wherein a range of the stroke of the piston rod in which the first passage area has the second passage area varying rate is wider than a range of the stroke of the piston rod in which the first passage area has the first passage area varying rate.

3. The shock absorber according to claim 2, wherein a damping coefficient when the first passage area has the second passage area varying rate is determined such that a proportion of the damping coefficient to a critical damping coefficient becomes constant with respect to a change in mass added to the piston rod or the cylinder.

4. The shock absorber according to claim 2, wherein a damping coefficient when the first passage area has the second passage area varying rate is determined such that a proportion of the damping coefficient to a critical damping coefficient becomes constant with respect to a change in mass added to the piston rod or the cylinder.

5. The shock absorber according to claim 1, wherein a damping coefficient when the first passage area has the second passage area varying rate is determined such that a proportion of the damping coefficient to a critical damping coefficient becomes constant with respect to a change in mass added to the piston rod or the cylinder.

6. The shock absorber according to claim 1, wherein the damping force generating device further includes a mechanism configured to cause the extension-side pilot chamber to communicate with the second chamber in a range where the piston rod extends to the outside of the cylinder at a maximum length-side predetermined position, the mechanism configured to further cause the second passage area between the extension-side pilot chamber and the first chamber to be larger than the first passage area between the extension-side pilot chamber and the second chamber.

7. The shock absorber according to claim 6, wherein a range of the stroke of the piston rod in which the first passage area has the second passage area varying rate is wider than a range of the stroke of the piston rod in which the first passage area has the first passage area varying rate.

8. The shock absorber according to claim 6, wherein a damping coefficient when the first passage area has the second passage area varying rate is determined such that a proportion of the damping coefficient to a critical damping coefficient becomes constant with respect to a change in mass added to the piston rod or the cylinder.

9. The shock absorber according to claim 7, wherein a damping coefficient when the first passage area has the second passage area varying rate is determined such that a proportion of the damping coefficient to a critical damping coefficient becomes constant with respect to the change in mass added to the piston rod or the cylinder.

10. A vehicle comprising:
a vehicle body;
a plurality of wheels including a front wheel and a rear wheel; and
a shock absorber attached between only the rear wheel and the vehicle body,
the shock absorber including:
a cylinder in which a working fluid is sealed;
a piston slidably fitted into the cylinder and configured to divide the inside of the cylinder into two chambers including a first chamber which is an upper side of the cylinder and a second chamber which is a lower side of the cylinder;

a piston rod connected to the piston and extending toward an outside of the cylinder;

a communication passage configured to cause the two chambers to communicate and configured to allow the working fluid to flow between the two chambers according to movement of the piston; and a damping force generating device installed at the communication passage and configured to limit a flow of the working fluid generated by movement of the piston to generate a damping force, wherein the damping force generating device includes:

an extension-side damping valve configured to generate a damping force mainly in an extension stroke, a compression-side damping valve configured to generate a damping force mainly in a compression stroke, an extension-side pilot chamber provided on the extension-side damping valve, the extension-side pilot chamber configured to apply an internal pressure to the extension-side damping valve in a direction closing the extension-side damping valve, a mechanism configured to cause the extension-side pilot chamber to communicate with the first chamber in a range where the piston rod enters further inside the cylinder than a minimum length-side predetermined position, the mechanism further configured to cause a first passage area communicating between the extension-side pilot chamber and the second chamber to be smaller than a second passage area communicating between the extension-side pilot chamber and the first chamber, wherein, when the piston rod strokes to an extension side and when the piston rod is at an intermediate predetermined position, the first passage area communicating between the extension-side pilot chamber and the second chamber is configured to have a first passage area varying rate with respect to the stroke of the piston rod and a second passage area varying rate with respect to the stroke of the piston rod that is smaller than the first passage area varying rate, and wherein, at least when the piston rod strokes to the extension side from the minimum length-side predetermined position, the first passage area is predetermined to have the first passage area varying rate.

\* \* \* \* \*